(12) United States Patent
Crane et al.

(10) Patent No.: US 6,414,823 B1
(45) Date of Patent: *Jul. 2, 2002

(54) COIL-STRUCTURES FOR MAGNETIC MICROACTUATOR

(75) Inventors: Peter Crane, Richfield; Wayne A. Bonin, North Oaks; Zine-Eddine Boutaghou, Vadnais Heights, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,421

(22) Filed: Jan. 24, 2000

Related U.S. Application Data

(60) Provisional application No. 60/138,309, filed on Jun. 9, 1999.

(51) Int. Cl.$^7$ .............................. G11B 5/56; G11B 21/24
(52) U.S. Cl. ................................... 360/294.5; 360/294.3
(58) Field of Search ........................... 360/294.4, 294.5, 360/294.1, 294.2, 294.3; 310/40 MM

(56) References Cited

U.S. PATENT DOCUMENTS

| | | | |
|---|---|---|---|
| 3,924,268 A | 12/1975 | McIntosh et al. | 360/78 |
| 4,374,402 A | 2/1983 | Blessom et al. | 360/104 |
| 4,651,242 A | 3/1987 | Hirano et al. | 360/103 |
| 4,764,829 A | 8/1988 | Makino | 360/106 |
| 4,914,725 A | 4/1990 | Belser et al. | 318/560 |
| 5,021,906 A | 6/1991 | Chang et al. | 360/103 |
| 5,034,828 A | 7/1991 | Ananth et al. | 360/75 |
| 5,177,652 A | 1/1993 | Yamaguchi et al. | 360/78.05 |
| 5,189,578 A | 2/1993 | Mori et al. | 360/106 |
| 5,303,105 A | 4/1994 | Jorgenson | 360/106 |
| 5,364,742 A | 11/1994 | Fan et al. | 430/317 |
| 5,375,033 A | 12/1994 | MacDonald | 361/281 |
| 5,521,778 A | 5/1996 | Boutaghou | 360/106 |
| 5,657,188 A | 8/1997 | Jurgenson et al. | 360/106 |
| 5,745,319 A | 4/1998 | Takekado et al. | 360/78.05 |
| 5,764,444 A | 6/1998 | Imamura et al. | 360/109 |

(List continued on next page.)

FOREIGN PATENT DOCUMENTS

| | | |
|---|---|---|
| EP | 0 412 221 B1 | 11/1989 |
| JP | 63-122069 | 5/1988 |
| JP | 02-263369 | 4/1989 |
| JP | 04-134681 | 5/1992 |
| JP | 04-368676 | 12/1992 |
| JP | 05-094682 | 4/1993 |
| JP | 06-020412 | 1/1994 |
| JP | 07-085621 | 3/1995 |

OTHER PUBLICATIONS

"Silicon Micromachined Electromagnetic Microactuators for Rigid Disk Drives" by Tang et al, *IEEE Transactions on Magnetics,* vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics,* vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics,* vol. 32, No. 5, Sep. 1996.

(List continued on next page.)

*Primary Examiner*—William Klimowicz
(74) *Attorney, Agent, or Firm*—Kinney & Lange, P.A.

(57) ABSTRACT

A microactuator for a disc drive includes a stator attached to the disc drive support structure, a rotor operatively attached to a slider, the rotor being movable with respect to the stator in a first horizontal plane generally parallel to the surface of the disc, and a vertically arranged magnetic circuit. The magnetic circuit is arranged in a plurality of planes substantially parallel to the first horizontal plane so as to move the microactuator rotor and the slider in the first horizontal plane with a stroke of at least 2 micro-meters in response to a current of no greater than 100 milli-Amps provided to the magnetic circuit.

18 Claims, 22 Drawing Sheets

U.S. PATENT DOCUMENTS

| | | | | |
|---|---|---|---|---|
| 5,781,381 | A | | 7/1998 | Koganezawa et al. ...... 360/106 |
| 5,796,558 | A | | 8/1998 | Hanrahan et al. ........... 360/106 |
| 5,801,472 | A | | 9/1998 | Wada et al. ................. 310/309 |
| 5,805,375 | A | | 9/1998 | Fan et al. ................. 360/78.12 |
| 5,834,864 | A | * | 11/1998 | Hesterman et al. ... 310/40 MM |
| 5,856,896 | A | | 1/1999 | Berg et al. .................. 360/104 |
| 5,867,347 | A | | 2/1999 | Knight et al. ............... 360/104 |
| 5,896,246 | A | | 4/1999 | Budde et al. ............... 360/104 |
| 5,898,541 | A | | 4/1999 | Boutaghou et al. ......... 360/109 |
| 5,898,544 | A | | 4/1999 | Krinke et al. ............... 360/104 |
| 5,920,441 | A | | 7/1999 | Cunningham et al. ... 360/78.05 |
| 5,936,805 | A | | 8/1999 | Imaino ....................... 360/104 |
| 5,959,808 | A | | 9/1999 | Fan et al. .................... 360/106 |
| 6,067,215 | A | * | 5/2000 | Zhang ........................ 360/260 |
| 6,078,473 | A | * | 6/2000 | Crane et al. ................ 360/104 |
| 6,122,149 | A | * | 9/2000 | Zhang et al. ............. 360/294.5 |
| 6,157,521 | A | * | 12/2000 | Utsunomiya ............. 360/294.5 |
| 6,201,668 | B1 | * | 3/2001 | Murphy .................... 360/294.4 |
| 6,239,952 | B1 | * | 5/2001 | Bonin ...................... 360/294.4 |
| 6,256,175 | B1 | * | 7/2001 | Zhang ..................... 360/294.5 |
| 6,295,185 | B1 | * | 9/2001 | Stefansky ................ 360/294.5 |

OTHER PUBLICATIONS

"Transverse Mode Electrostatic Microactuator for MEMS–Based HDD Slider" by Imamura et al, *IEEE* 1996.

"An Experiment for Head Positioning System Using Sub–micron Track–width GMR Head" by Yoshikawa et al., *IEEE Transactions on Magnetics,* vol. 32, No. 5, Sep. 1996.

"Micro Electrostatic Actuators in Dual–Stage Disk Drives with High Track Density" by Tang et al., *IEEE Transactions on Magnetics,* vol. 32, No. 5, Sep. 1996.

"Piezoelectric Microactuator Compensating for Off–Track Errors in Magnetic Disk Drives" by Imamura et al, *Advance Information Storage Systems,* vol. 5, pp 119–125.

"A Dual–Stage Magnetic Disk Drive Actuator Using a Piezoelectric Device for a High Track Density" by Mori et al., *IEEE Transactions on Magnetics,* vol. 27, No. 6, Nov. 1991.

"Dynamic Loading Criteria for 3–1/2 Inch Inline HDD Using Multilayer Piezoelectric Load/Unload Machanism" by Kajitani et al., *IEEE Transactions on Magnetics,* vol. 27, No. 6, Nov. 1991.

"Design, Fabrication, and Testing of Silicon Microgimbals for Super–Compact Rigid Disk Drives" by Temesvary et al., *Journal of Microelectromechanical Systems,* vol. 4, No. 1, Mar. 1995.

* cited by examiner

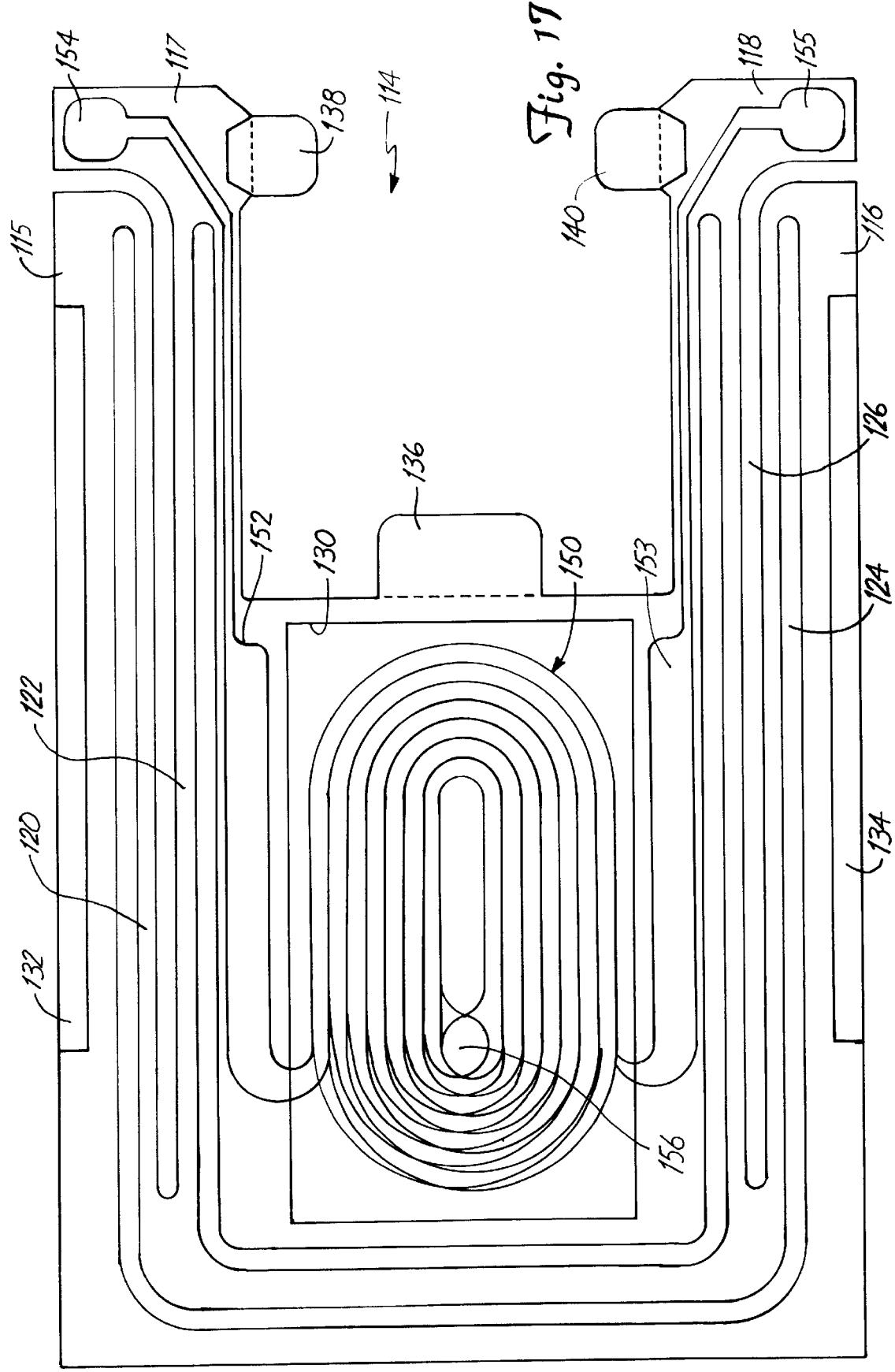

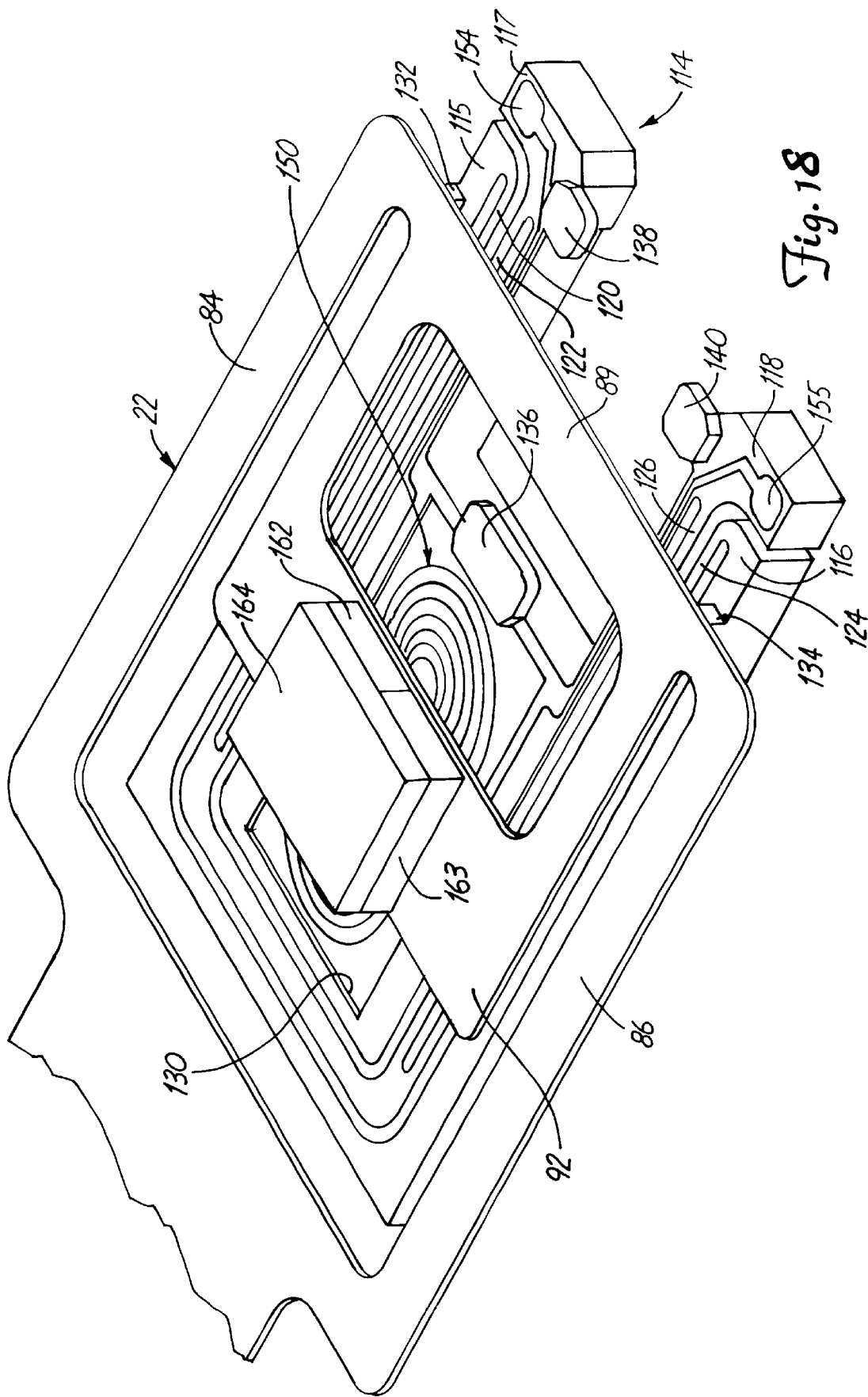

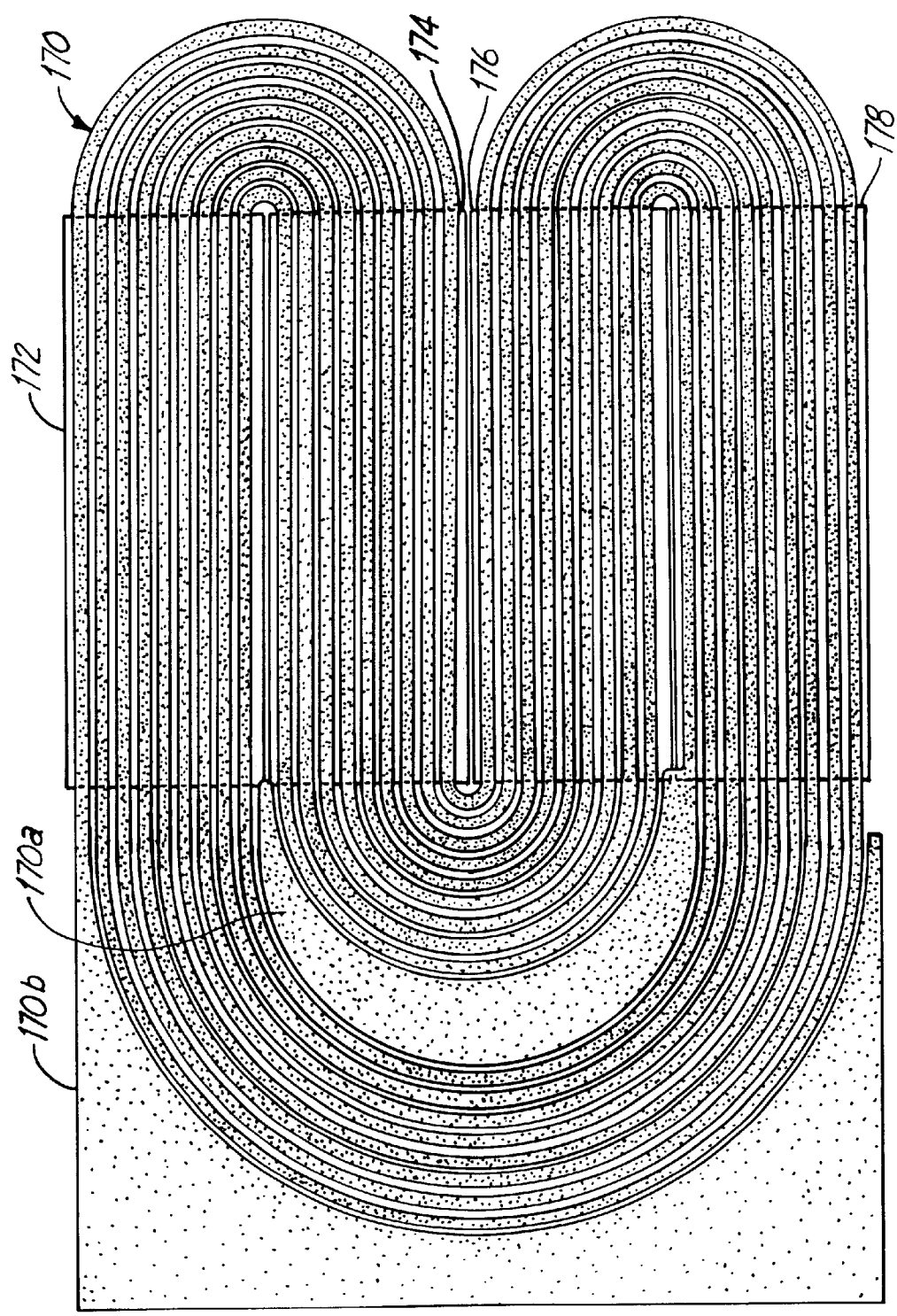

COIL-STRUCTURES FOR MAGNETIC MICROACTUATOR

CROSS-REFERENCE TO RELATED APPLICATION

This application claims priority from Provisional Application No. 60/138,309 filed Jun. 9, 1999 for "Novel Coil Structures For Magnetic Micro-Actuators" by P. Crane, W. Bonin and Z. Boutaghou.

BACKGROUND OF THE INVENTION

The present invention relates to a disc drive microactuator, and more particularly to improved coil structures for use in a magnetic microactuator utilizing a vertical magnetic circuit contained on a substrate and a flex circuit to provide microactuation force.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large scale motor lacks sufficient resolution to effectively accommodate high track-density discs. Thus, a high resolution head positioning mechanism, or microactuator, is necessary to accommodate the more densely spaced tracks.

One promising approach for high resolution head positioning involves employing a high resolution microactuator in addition to the conventional lower resolution actuator motor, thereby effecting head positioning through dual-stage actuation. Various microactuator designs have been considered to accomplish high resolution head positioning. One design involves inserting a silicon-based thin film structure between the suspension and the slider in a disc drive assembly. A major technical challenge in implementing such a microactuator is to provide sufficiently large actuation force to overcome spring bias forces to drive the head at a speed high enough to accommodate the required bandwidth. Such a design must be realized in a relatively small wafer area, to keep costs reasonable and to allow easy integration into the disc drive design.

Therefore, there is a need in the art for a microactuator design providing large actuation force with reasonable power consumption and within a reasonable wafer area to microposition a transducing head at a speed that accommodates the high bandwidth required by high performance disc drives. One design for achieving this goal is disclosed in U.S. application Ser. No. 09/315,006, filed May 19, 1999 for "Magnetic Microactuator" by P. Crane, W. Bonin and B. Zhang, which is hereby incorporated by reference. Additional improvements to such a design are desirable to further advance the state of the art.

BRIEF SUMMARY OF THE INVENTION

The present invention is a microactuator for a disc drive includes a stator attached to the disc drive support structure, a rotor operatively attached to a slider, the rotor being movable with respect to the stator in a first horizontal plane generally parallel to the surface of the disc, and a vertically arranged magnetic circuit. The magnetic circuit is arranged in a plurality of planes substantially parallel to the first horizontal plane so as to move the microactuator rotor and the slider in the first horizontal plane with a stroke of at least about 2 micro-meters in response to a current of no greater than about 100 milli-Amps provided to the magnetic circuit.

BRIEF DESCRIPTION OF THE DRAWINGS

FIG. 17 is a top view of the microactuator suspension shown in FIG. 11 illustrating the second coil layer.

FIG. 18 is a perspective view of the microactuator suspension shown in FIG. 11 having an attached flex circuit carrying the magnets and top keeper according to the third embodiment of the present invention.

FIG. 20 is a plan view of a single-layer coil for use with a magnetic microactuator employing four magnets, according to a fourth embodiment of the present invention.

DETAILED DESCRIPTION

Figure 1:
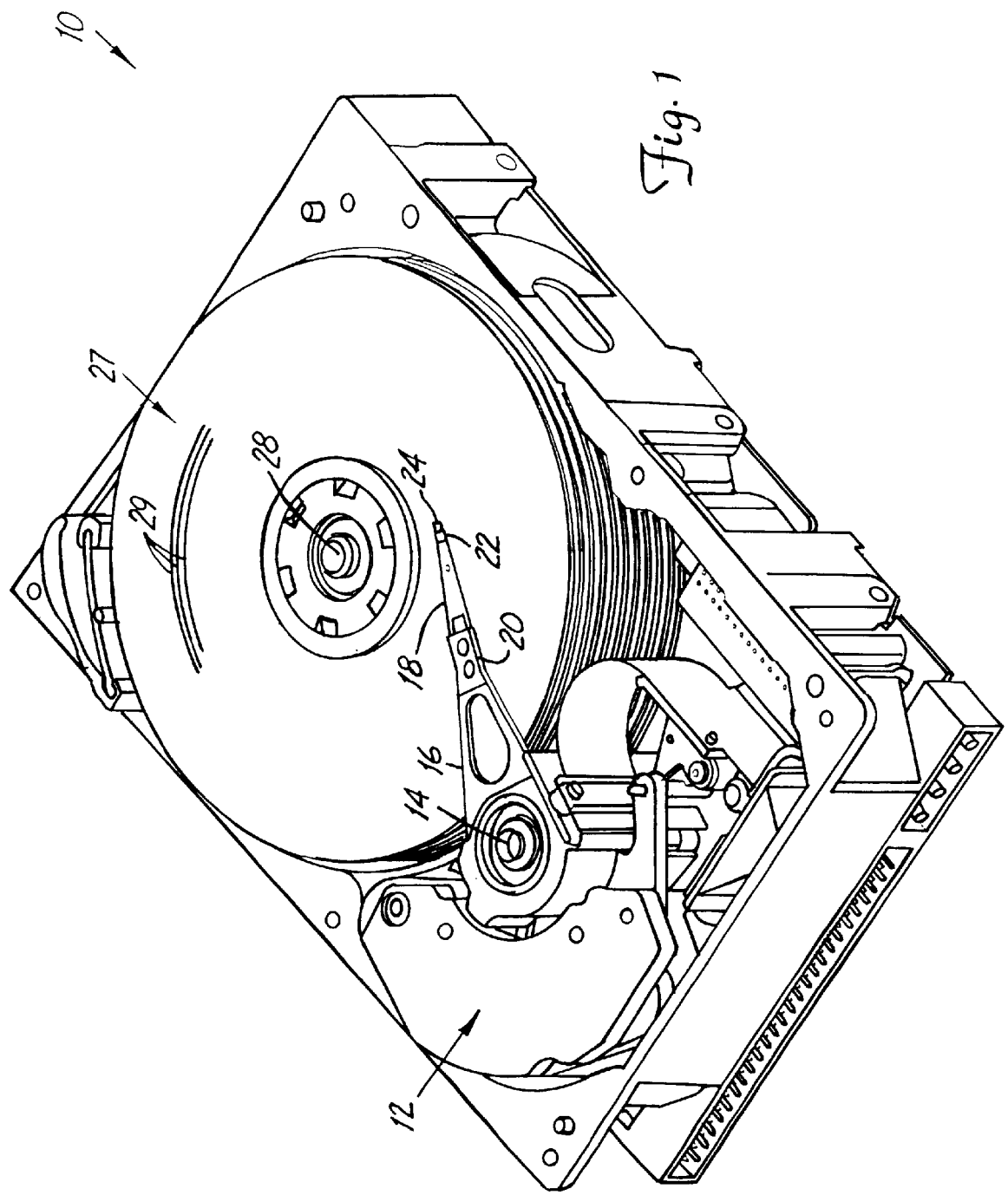
FIG. 1 is a perspective view of a disc drive actuation system for positioning a slider over tracks of a disc.

FIG. 1 is a perspective view of a disc drive actuation system 10 for positioning slider 24 over a track 29 of disc 27. Actuation system 10 includes voice coil motor (VCM) 12 arranged to rotate actuator arm 16 on a spindle around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on concentric tracks 29 of disc 27. Disc 27 rotates around axis 28, so that windage is encountered by slider 24 to keep it aloft a small distance above the surface of disc 27.

VCM 12 is selectively operated to move actuator arm 16 around axis 14, thereby moving slider 24 between tracks 29 of disc 27. However, for disc drive systems with high track density, VCM 12 lacks sufficient resolution and frequency response to position a transducing head on slider 24 precisely over a selected track of disc 27. Therefore, a higher resolution actuation device is necessary.

Figure 2:
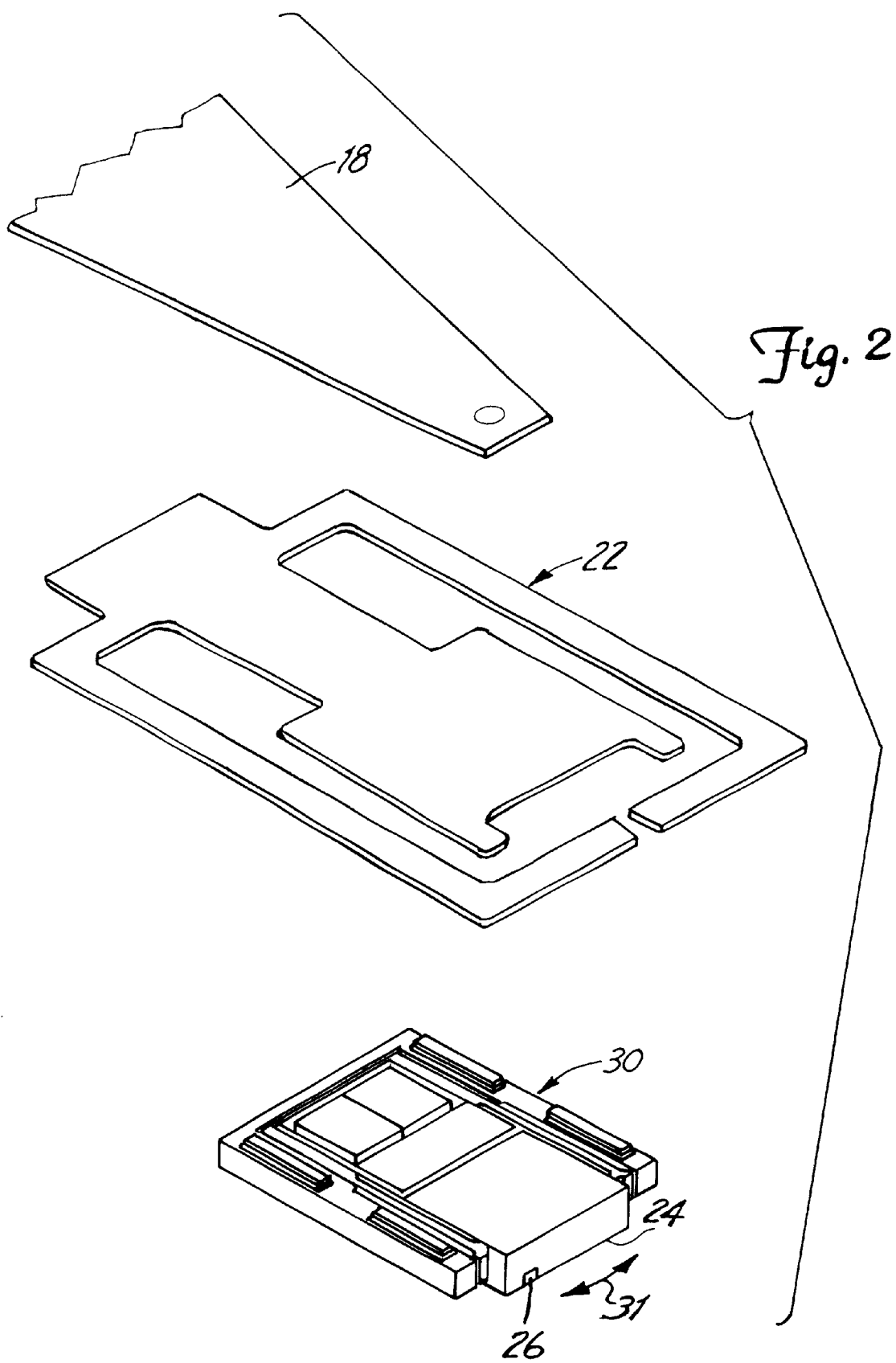
FIG. 2 is an exploded perspective view of a portion of a disc drive including a microactuator according to the present invention.

FIG. 2 is an exploded perspective view of a portion of a disc drive including microactuator 30 for high resolution head positioning. Flexure 22 is attached to load beam 18, and microactuator 30 is attached to flexure 22 to carry slider 24 above a surface of disc 27 (FIG. 1). Transducing head 26 is carried by slider 24 to transduce data with the disc.

In operation of the disc drive, load beam 18, flexure 22 and microactuator 30 carrying slider 24 are all moved together as coarse positioning is performed by VCM 12 (FIG. 1) moving actuator arm 16 (FIG. 1). To achieve fine positioning of transducing head 26, microactuator 30 generates a force which causes bending of the beam springs of the microactuator. As a result, the portion of microactuator 30 carrying slider 24 moves slightly with respect to flexure 22 in the direction of arrows 31, displacing transducing head 26 with high resolution for precise positioning over a selected track of the disc.

First Embodiment (FIGS. 3–6)

Figure 3:
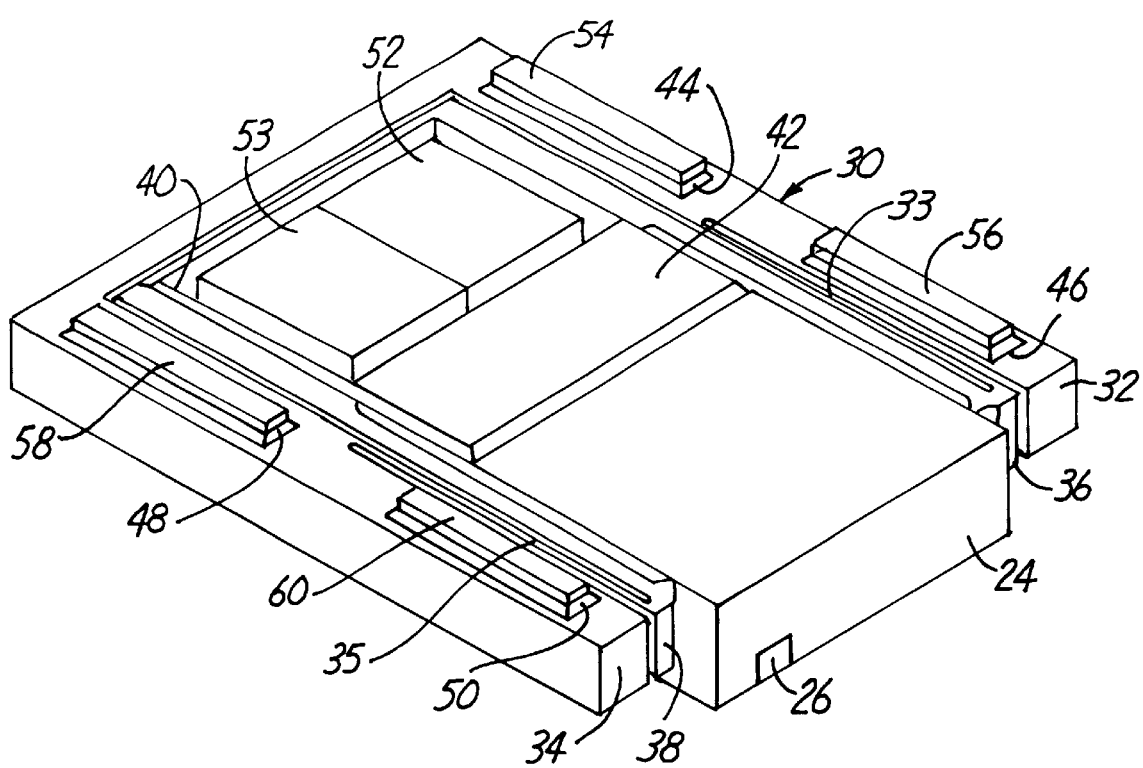
FIG. 3 is a perspective view of a microactuator system for positioning a slider over tracks of a disc.
Figure 4:
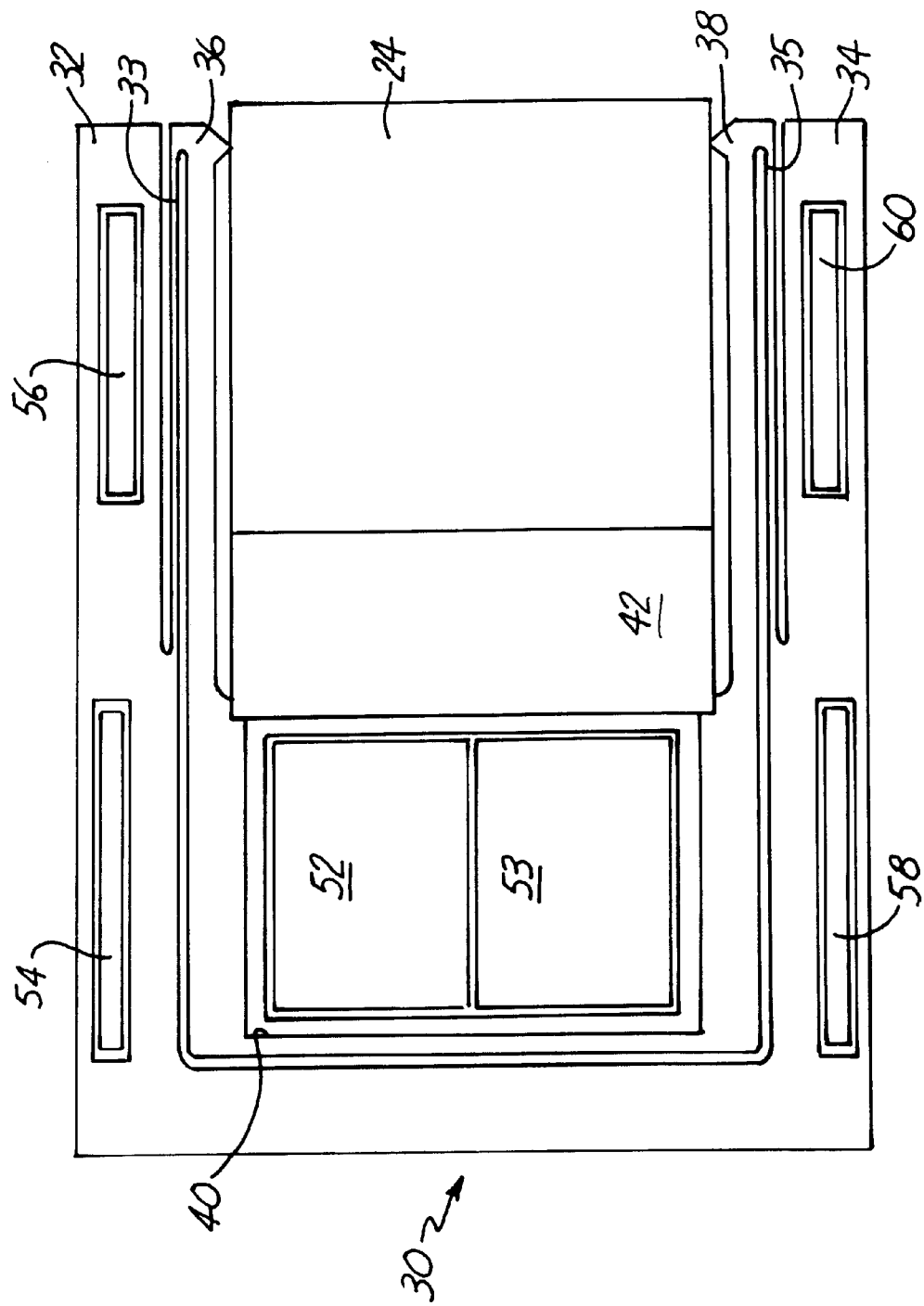
FIG. 4 is a top view of the microactuator system shown in FIG. 3.

FIG. 3 is a perspective view, and FIG. 4 is a top view, of microactuator 30 for use in a disc drive system. Microactuator 30 includes outer preloading bars 32 and 34 and inner alignment clips 36 and 38, with inner alignment clips 36 and 38 clamping against the sides of slider 24 at a frontal portion (to the right in FIGS. 3 and 4) thereof. Flexible beam springs 33 and 35 extend between the proximal ends of preloading bars 32 and 34 and the distal ends of alignment clips 36 and 38. Tub 40 having a bottom surface lined with a ferromagnetic keeper material is formed in the substrate of microactuator 30 opposite transducing head 26 of slider 24, and structural bond pad 42 is provided for attachment to the top surface (opposite the air-bearing surface) of slider 24. Magnets 52 and 53 are located in tub 40, attached to the ferromagnetic lining on the bottom surface of tub 40. Standoffs 54, 56, 58 and 60 are formed on respective standoff bases 44, 46, 48 and 50 on outer preloading bars 32 and 34, to be borne upon so as to apply pre-load force to microactuator 30 as it supports slider 24 over the surface of the disc. In an exemplary configuration, microactuator 30 has an outer perimeter of about 2195 by 1600 by 200 microns. The detail of the construction and operation of microactuator 30 are disclosed in U.S. application Ser. No. 09/315,006, which has been incorporated herein by reference.

Figure 5:
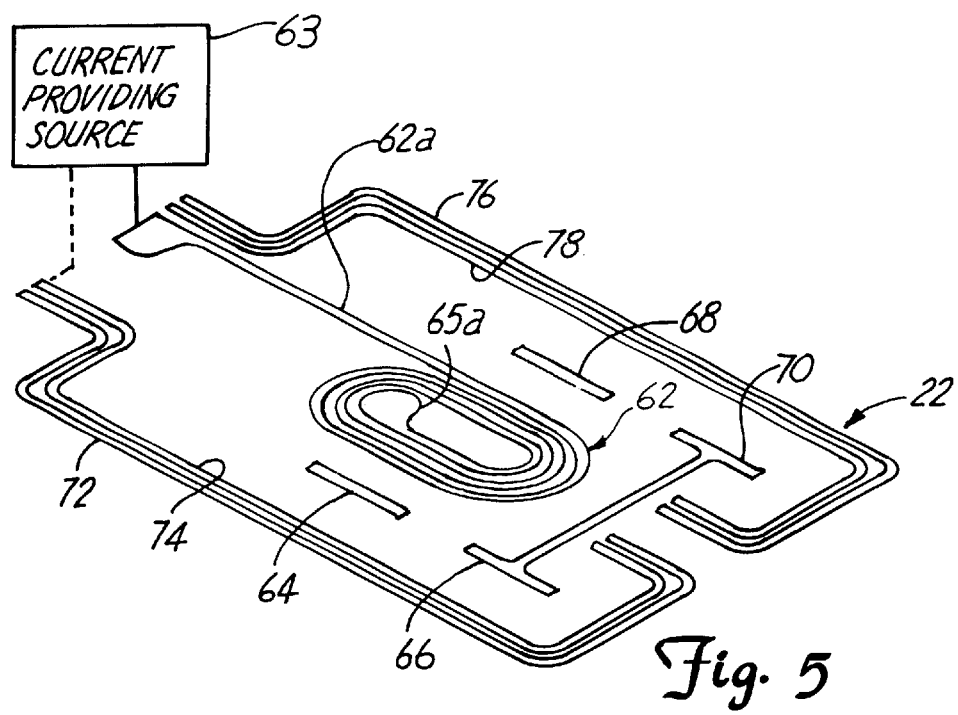
FIG. 5 is a perspective view of the underside of a flex circuit for use with a magnetic microactuator according to a first embodiment of the present invention.

FIG. 5 is a perspective view of the underside of flexure 22 having flex circuit patterns formed thereon for use with a magnetic microactuator according to a first embodiment of the present invention. Flexure 22 is formed of a non-conductive polyimide material such as Kapton, for example, and forms the substrate of a flex circuit including conductive coil first layer 62a connected to current-providing source 63, and standoffs 64, 66, 68 and 70. Standoffs 64, 66, 68 and 70 are aligned with respective standoffs 54, 56, 58 and 60 of microactuator 30 to apply pre-load force to microactuator 30 as it carries slider 24 (FIG. 3). In addition, conductive leads 72, 74, 76 and 78 are provided to electrically contact transducing head 26 carried by slider 24 (FIG. 3). Coil 62 and data leads 72, 74, 76 and 78 are formed of a conductive material such as copper. Standoffs 64, 66, 68 and 70 are preferably formed of copper, or alternatively of a material such as nickel. In some embodiments, standoffs 64, 66, 68 and 70 may be formed with sufficient thickness so as to render standoffs 54, 56, 58 and 60 on microactuator 30 (FIG. 3) unnecessary. The total standoff height between magnets 52 and 53 and coil 62 is typically about 10 to 100 micrometers ($\mu$m), with an exemplary height of 50 $\mu$m in one embodiment. Flexure 22 is typically about 50 $\mu$m thick, and may be made as thin as about 25 $\mu$m with some trade-off in durability. In an exemplary embodiment, coil first layer 62a is about 15 $\mu$m thick.

Figure 6:
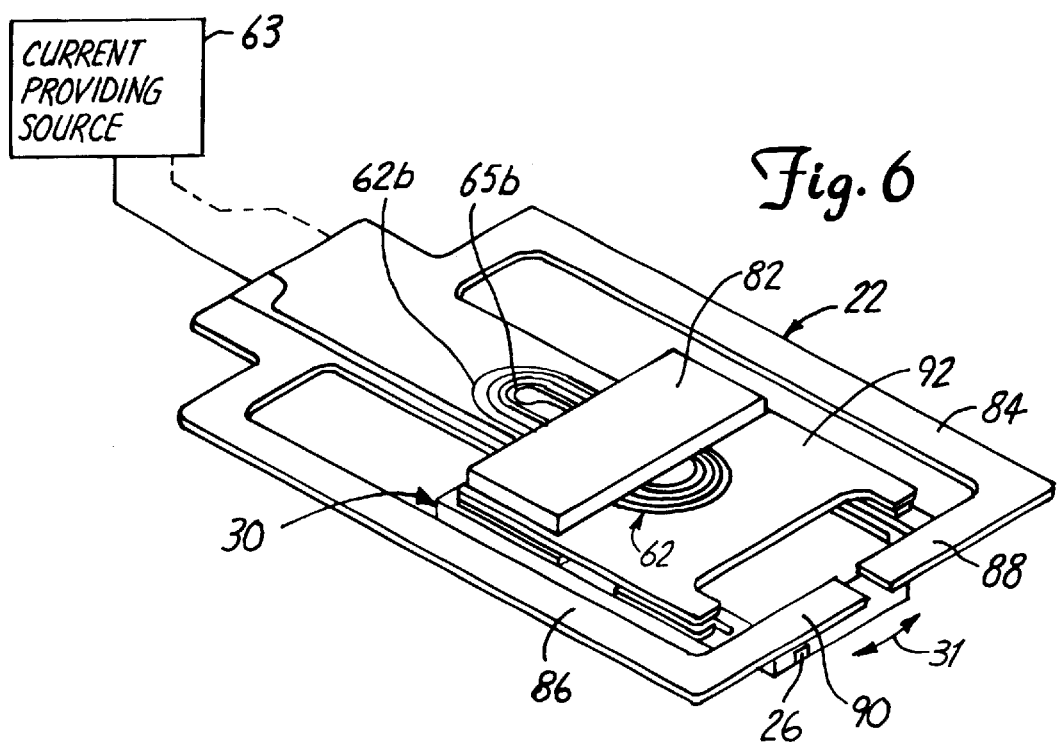
FIG. 6 is a perspective view of the magnetic microactuator attached to the flex circuit according to the first embodiment of the present invention.

FIG. 6 is a perspective view of microactuator 30 of the present invention attached to the underside of flexure 22 for use in a disc drive. Flexure 22 includes conductive coil second layer 62b and ferromagnetic keeper 82 formed on its top surface opposite coil first layer 62a (FIG. 5) above magnets 52 and 53 located in tub 40 of microactuator 30 (FIG. 3). A vertically arranged magnetic circuit is thereby formed from the bottom keeper (ferromagnetic lining of tub 40), magnets 52 and 53, an airgap formed by the spacing between magnets 52 and 53 and dual-layer coil 62, the windings of coil layers 62a and 62b themselves, flexure 22 and top keeper 82. The operation and characteristics of this magnetic circuit are disclosed in the aforementioned Crane et al. application. Keeper 82 may be plated on the polyimide substrate of flexure 22 (with an insulating layer for isolating keeper 82 from coil second layer 62b) or adhesively bonded thereto.

Flexure 22 is shaped to include arms 84 and 86 and cross beams 88 and 90 for supporting data leads 72, 74, 76 and 78, and central portion 92 for supporting coil 62 and standoffs 64, 66, 68 and 70. Pre-load force is applied in a preferred embodiment to central portion 92 of flexure 22 by load beam 18 (FIG. 2). The arrangement of flexure 22 and the design of microactuator 30 are such that operation of microactuator 30 by circulating current through the windings of dual-layer coil 62 results in cross-track movement of slider 24 in a horizontal plane generally parallel to the surface of the disc, in the direction of arrows 31, with the movement being permitted by the flexibility of beam springs 33 and 35 (FIG. 3). Outer preloading bars 32 and 34 having standoffs 54, 56, 58 and 60 thereon effectively form the stator of the motor, with magnets 52 and 53, slider bond pad 42, slider 24, flexible beams 33 and 35 and inner alignment clips 36 and 38 effectively forming the rotor of the motor (FIG. 3). Thus, lateral movement of magnets 52 and 53 affects the cross-track (radial) position of slider 24 with respect to outer preloading bars 32 and 34 and standoffs 54, 56, 58 and 60, and also with respect to flexure 22 and to the tracks of the disc, thereby achieving high resolution positioning of the transducing head.

Conductive coil first layer 62a and second layer 62b are formed on opposite sides of the polyimide substrate of flexure 22, with a conductive via connecting the layers through the substrate at vertically adjacent portions 65a and 65b. In an exemplary embodiment, the conductive via extends through a 75 µm diameter hole laser drilled in the flexure substrate. The wire width and spacing of coil first layer 62a and second layer 62b is presently constrained to a minimum of about 38 µm due to limitations of flexure processing; smaller wire widths and spacings are contemplated by the present invention as the resolution of flexure processing improves. With the wire width and spacing at 38 µm, 20 traverses of the face of magnets 52 and 53 are made, with coil 62 having a length of 559 µm. With the exemplary dimensions given above, coil 62 has a resistance of 1.54 Ohms at an operating temperature of 150° C. A current of 100 milli-Amperes (mA) provided by current providing source 63 through coil 62 results in an actuation force of 0.67 milli-Newtons (mN), achieved with power dissipation of 15 milli-Watts (mW). For a design implementing microactuator 30 as shown in FIGS. 3 and 4 and having a typical offtrack resonance of 1000 Hz, a microactuation stroke of 6.4 µm in each direction is achieved. In most typical disc drive systems, a microactuator stroke of 1 to 2 µm is required for tracking operations (centering the head over a selected track), while a microactuator stroke of greater than 2 µm is required for seeking operations (moving the head between tracks). The embodiment shown in FIGS. 5 and 6 is therefore a simple design that is able to provide a useful microactuator stroke with an actuation current of 100 mA or less, with low power dissipation. The fabrication processes of this embodiment are also relatively simple and inexpensive to perform.

Second Embodiment (FIGS. 7A–7C and 8–14)

Figure 7A:
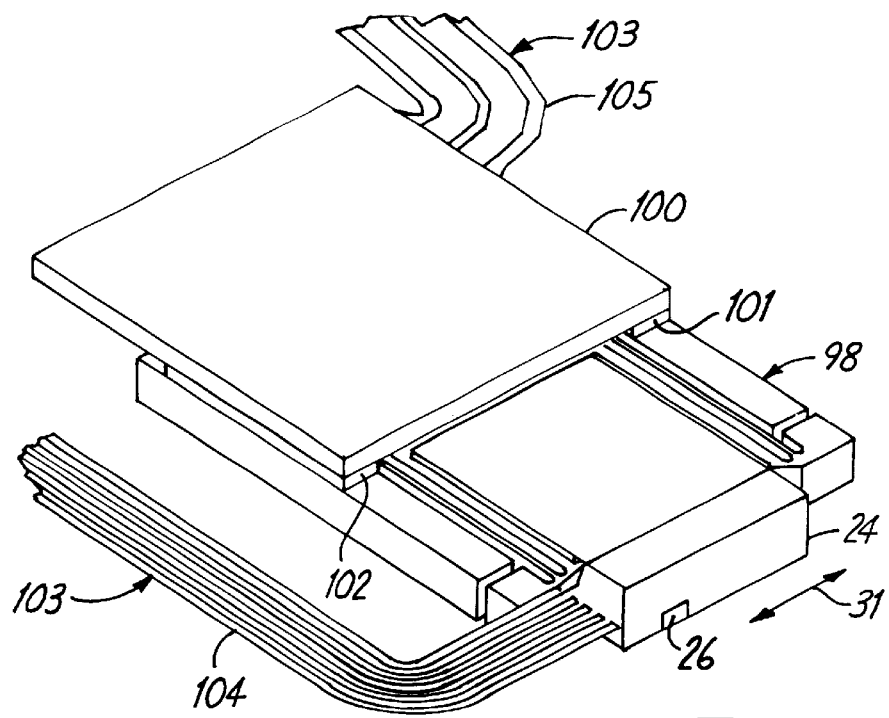
FIG. 7A is a top perspective view of a magnetic microactuator system having a top keeper plate carrying a dual-layer coil according to a second embodiment of the present invention.
Figure 7C:
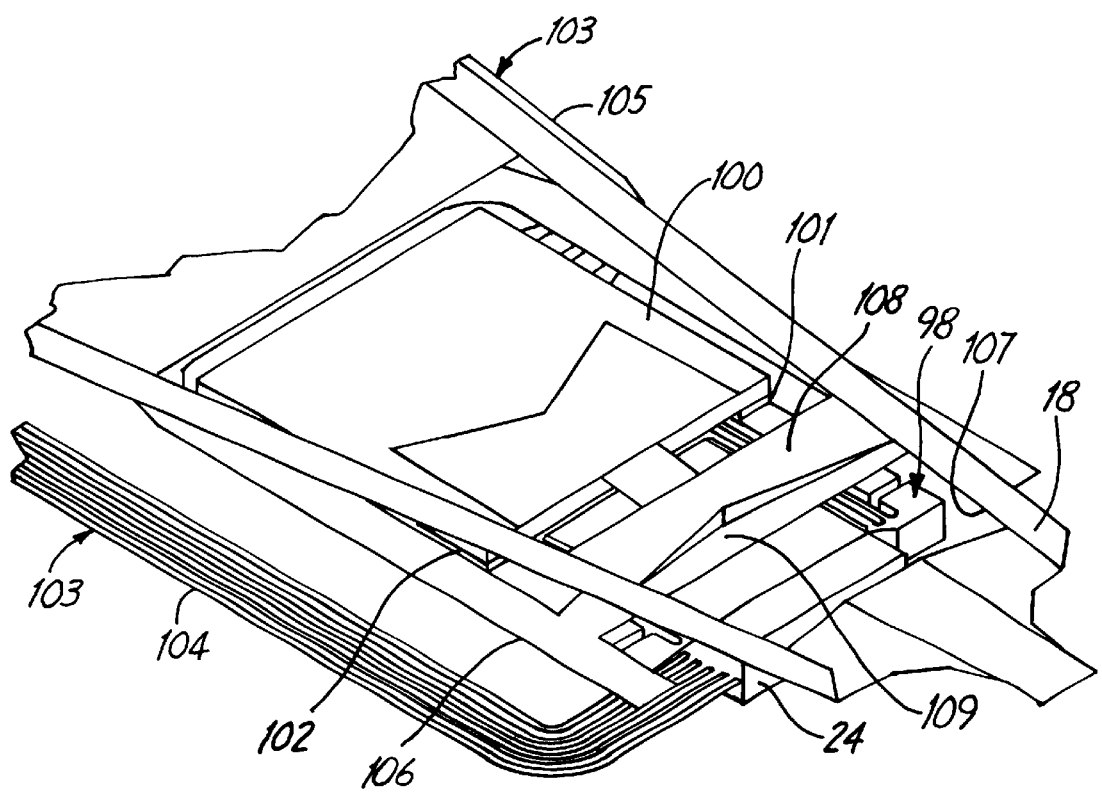
FIG. 7C is a perspective view of the magnetic microactuator system shown in FIGS. 7A and 7B showing connections to a load beam and gimbal for implementing the system in a disc drive.
Figure 7B:
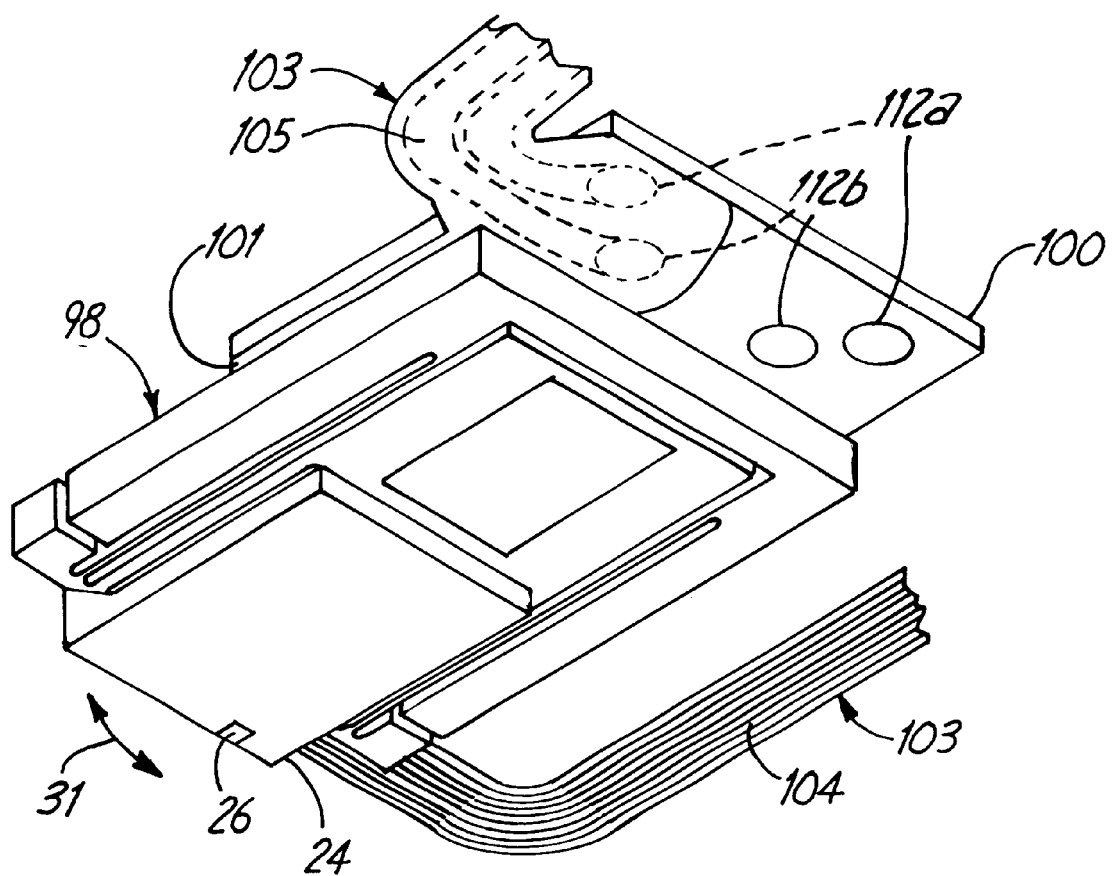
FIG. 7B is a bottom perspective view of the magnetic microactuator system shown in FIG. 7A.

FIG. 7A is a top perspective view, and FIG. 7B is a bottom perspective view, of a magnetic microactuator system having top keeper plate 100 carrying a dual-layer coil according to a second embodiment of the present invention. Top keeper plate 100 is formed of a ferromagnetic material, carries a dual-layer coil on its underside surface, and is attached to microactuator 98 on standoffs 101 and 102 by a suitable bonding method known in the art. Microactuator 98 has a bottom ferromagnetic keeper and a pair of magnets formed thereon, and is constructed in a manner similar to magnetic microactuator 30 described above, thereby creating a vertical magnetic circuit that is able to horizontally move the magnets of the microactuator and effect displacement of transducing head 26 in the direction of arrows 31. Similarly to microactuator 30, microactuator 98 has an outer perimeter of about 2195 by 1600 by 200 microns in an exemplary configuration. Flex circuit 103 is provided for electrical connections, with flex circuit portion 104 electrically connecting to transducing head 26 on slider 24, and flex circuit portion 105 electrically connecting to the dual-layer coil carried by top keeper plate 100, at bond pads 112a and 112b. The details of top keeper plate 100 are discussed below with respect to FIGS. 8–11.

FIG. 7C is a perspective view of the magnetic microactuator system shown in FIGS. 7A and 7B, including load beam 18 and gimbal 106 arranged to implement the microactuator system in a disc drive. Load beam 18 includes an aperture 107 spanned by a central dimpled portion 108 for applying the necessary pre-loading force to maintain slider 24 in proximity with the surface of the disc. Gimbal 106 is attached between load beam 18 and top keeper 100, and includes bridge portion 109 that is borne upon by dimpled portion 108 of load beam 18 to apply the pre-loading force through microactuator 30 to slider 24.

Figure 8:
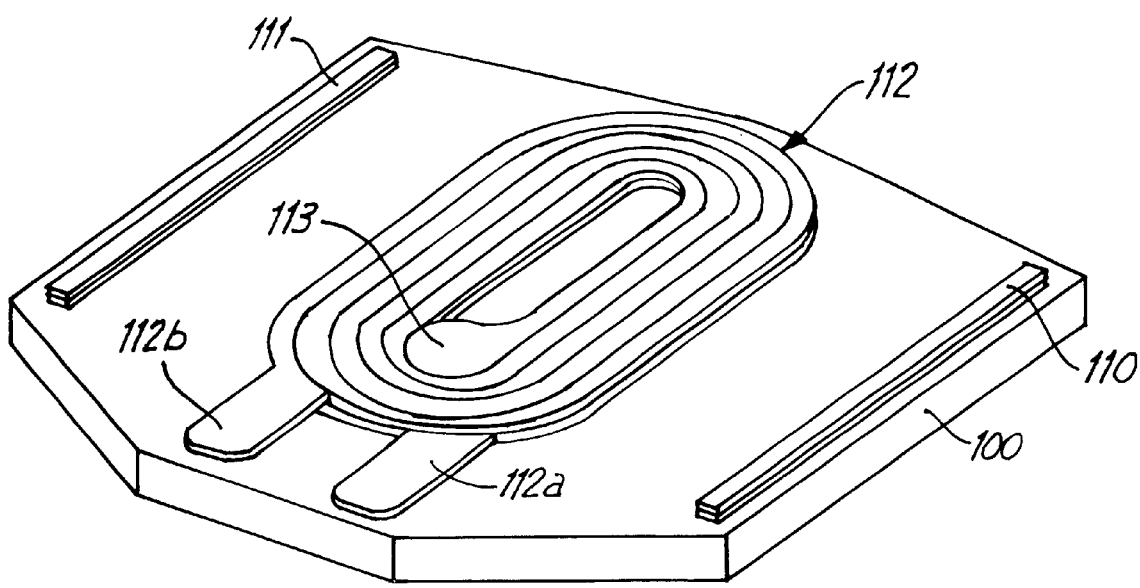
FIG. 8 is a perspective view of the underside of the top keeper plate according to the second embodiment of the present invention.
Figure 9:
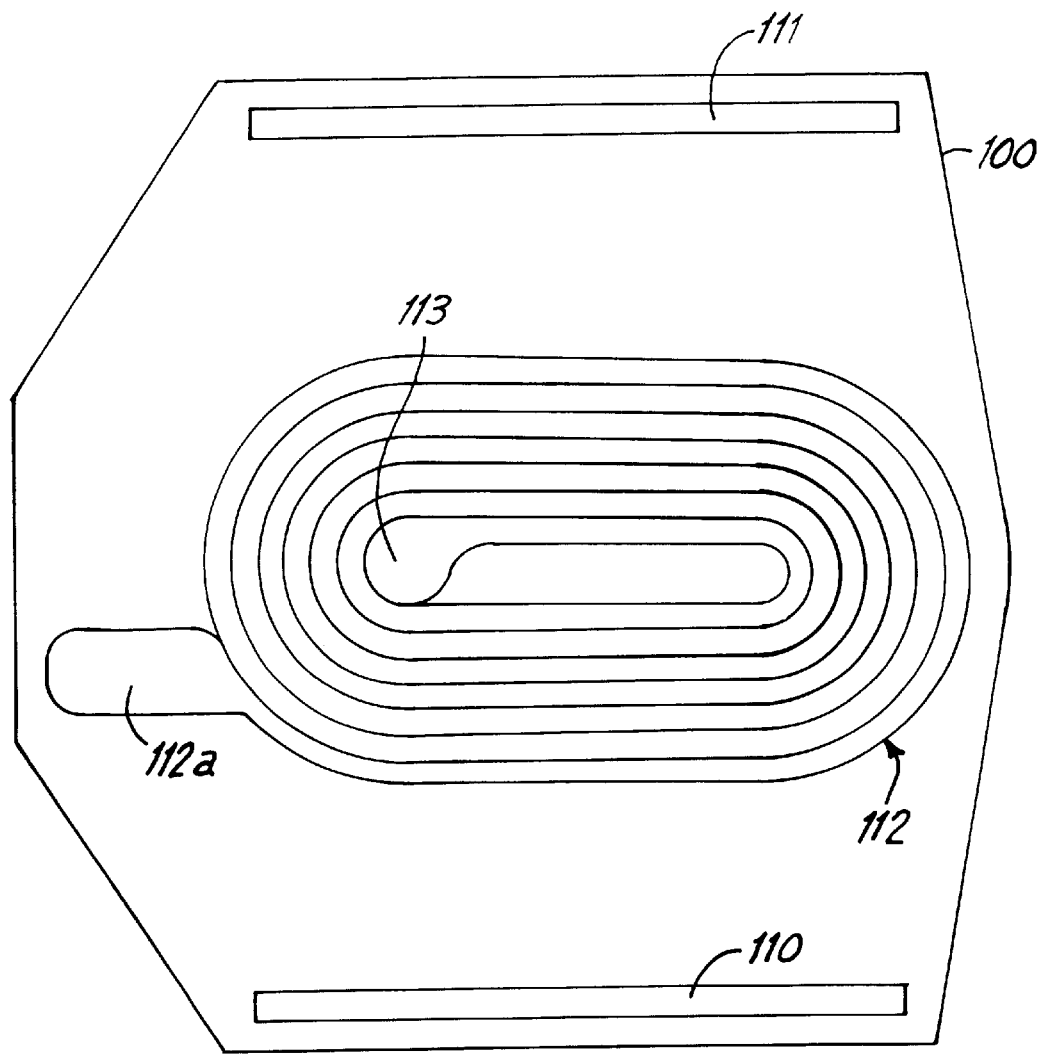
FIG. 9 is a bottom view of the top keeper plate illustrating a first coil layer according to the second embodiment of the present invention.
Figure 10:
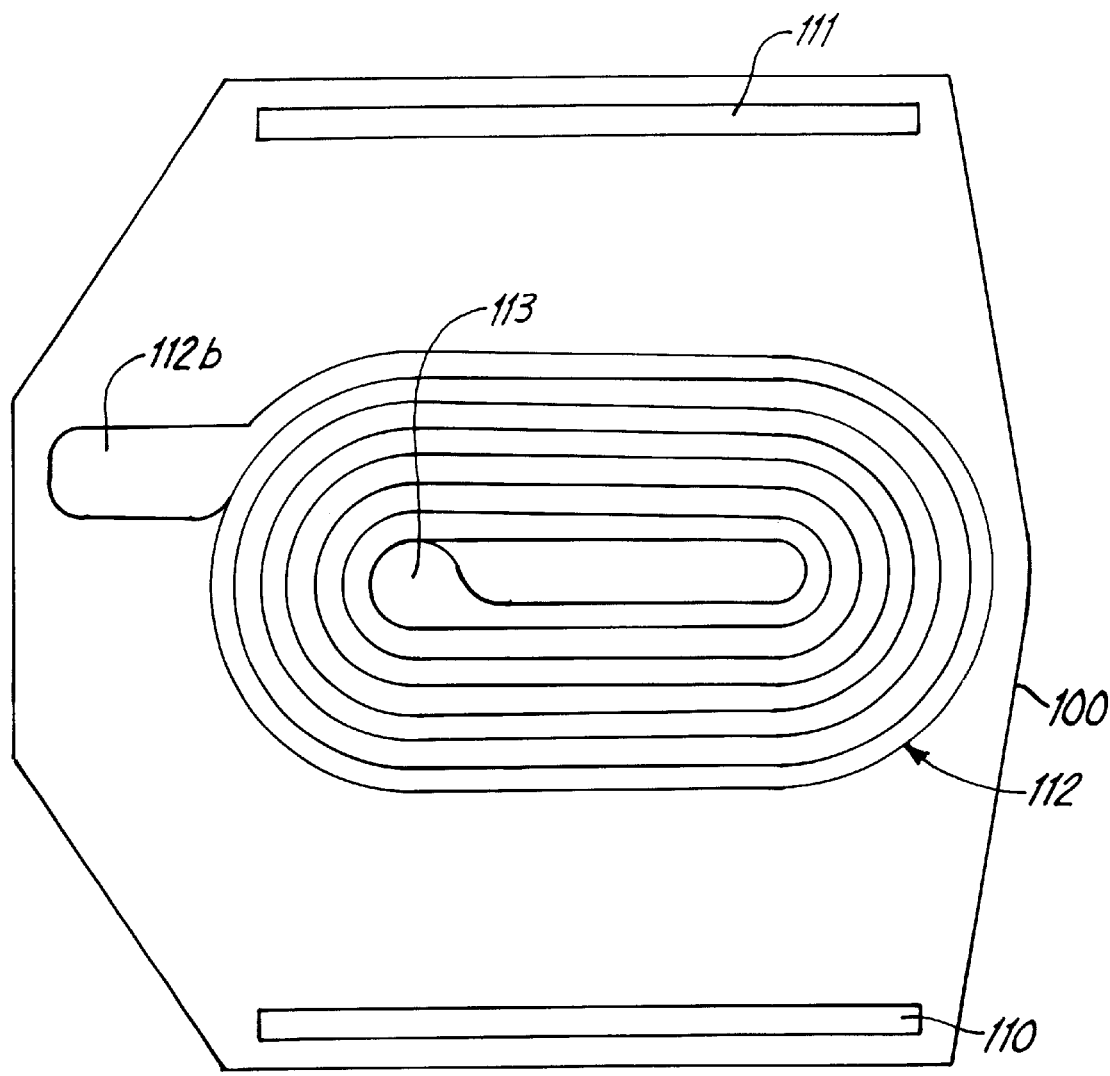
FIG. 10 is a bottom view of the top keeper plate illustrating a second coil layer according to the second embodiment of the present invention.

FIG. 8 is a perspective view of the underside of top keeper plate 100 according to the second embodiment of the present invention. Top keeper plate 100 includes standoffs 110 and 111 for vertically spacing top keeper plate 100 from microactuator 30 when it is bonded thereto on standoffs 101 and 102 (FIG. 7A). Dual-layer coil 112 is formed on the underside of top keeper plate 100 from a conductive material such as copper, with a first layer of coil 112 terminating at first layer bond pad 112a and a second layer of coil 112 terminating at second layer bond pad 112b. Bond pads 112a and 112b are electrically connected to flex circuit portion 105 (FIGS. 7A and 7B) for connection to a current-providing source to circulate microactuation current through coil 112. In an exemplary embodiment, coil 112 is underslung beyond the edge of top keeper plate 100, with upward facing bond pads 112a and 112b disposed to simplify the electrical connection to flex circuit portion 105. The two layers of coil 112 are connected together by vertical via 113 to form a continuous coil structure for circulation of actuation current. FIG. 9 is a bottom view of top keeper plate 100 showing the first layer of coil 112, and FIG. 10 is a bottom view of top keeper plate 100 showing the second layer of coil 112.

Figure 11:
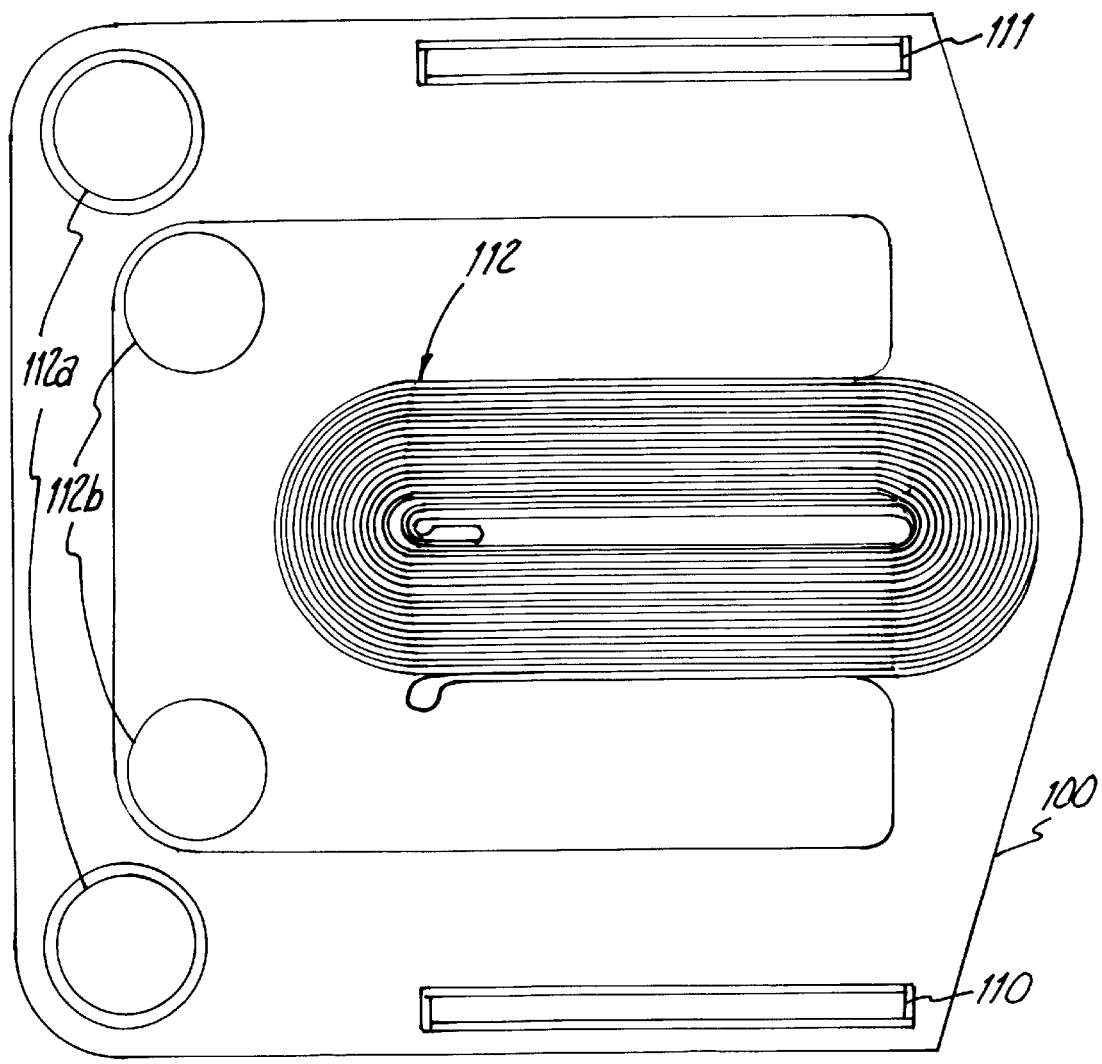
FIG. 11 is a bottom view of the top keeper plate according to the second embodiment of the present invention, having separate coil terminals formed thereon for electrically contacting a flex circuit.

FIG. 11 is a bottom view of another configuration of top keeper plate 100 having separate coil terminal bond pads 112a and 112b formed thereon for electrically contacting flex circuit portion 105 (FIGS. 7A and 7B). Coil terminal bond pads 112a and 112b are electrically connected to the respective layers of dual-layer coil 112, although these connections are not visible in FIG. 11 because of the presence of an insulating layer over the conductors between coil terminal bond pads 112a and 112b and dual-layer coil 112.

Figure 12:
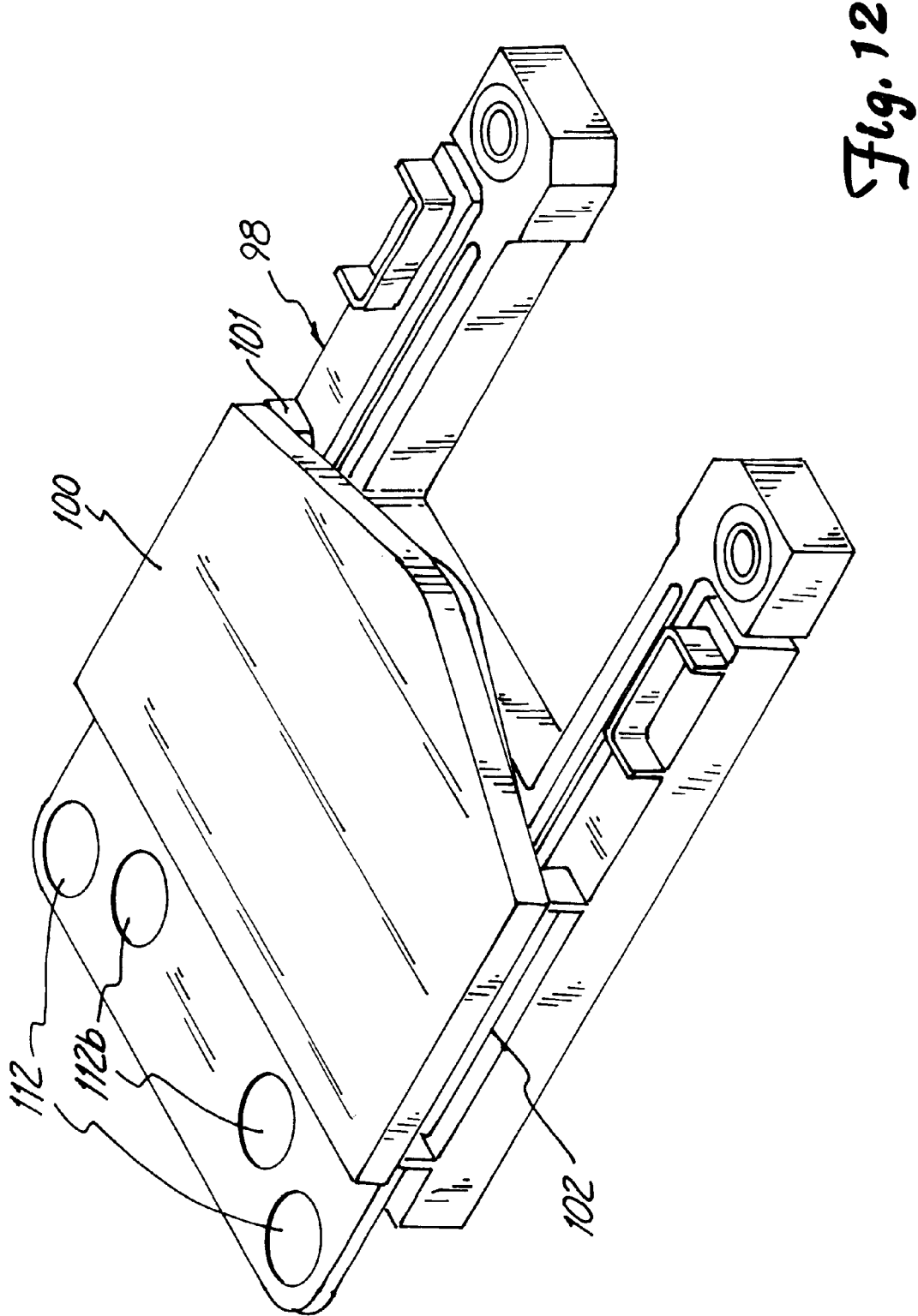
FIG. 12 is a top perspective view of a magnetic microactuator system with a top keeper plate carrying a dual-layer coil and having upwardly facing separate coil terminals according to an alternate arrangement of the second embodiment of the present invention.

FIG. 12 is a perspective view of magnetic microactuator system 98 having top keeper plate 100 carrying a dual-layer coil and having upwardly facing separate coil terminal bond pads 112a and 112b for connecting the dual-layer coil to a flex circuit. Coil terminal bond pads 112a and 112b are electrically connected to the respective layers of the dual-layer coil carried on the underside of top keeper plate 100. Top keeper plate 100 is positioned on standoffs 101 and 102 in a manner similar to that shown in FIG. 7A, vertically adjacent to the magnets and the bottom keeper carried by microactuator 98.

Figure 13:
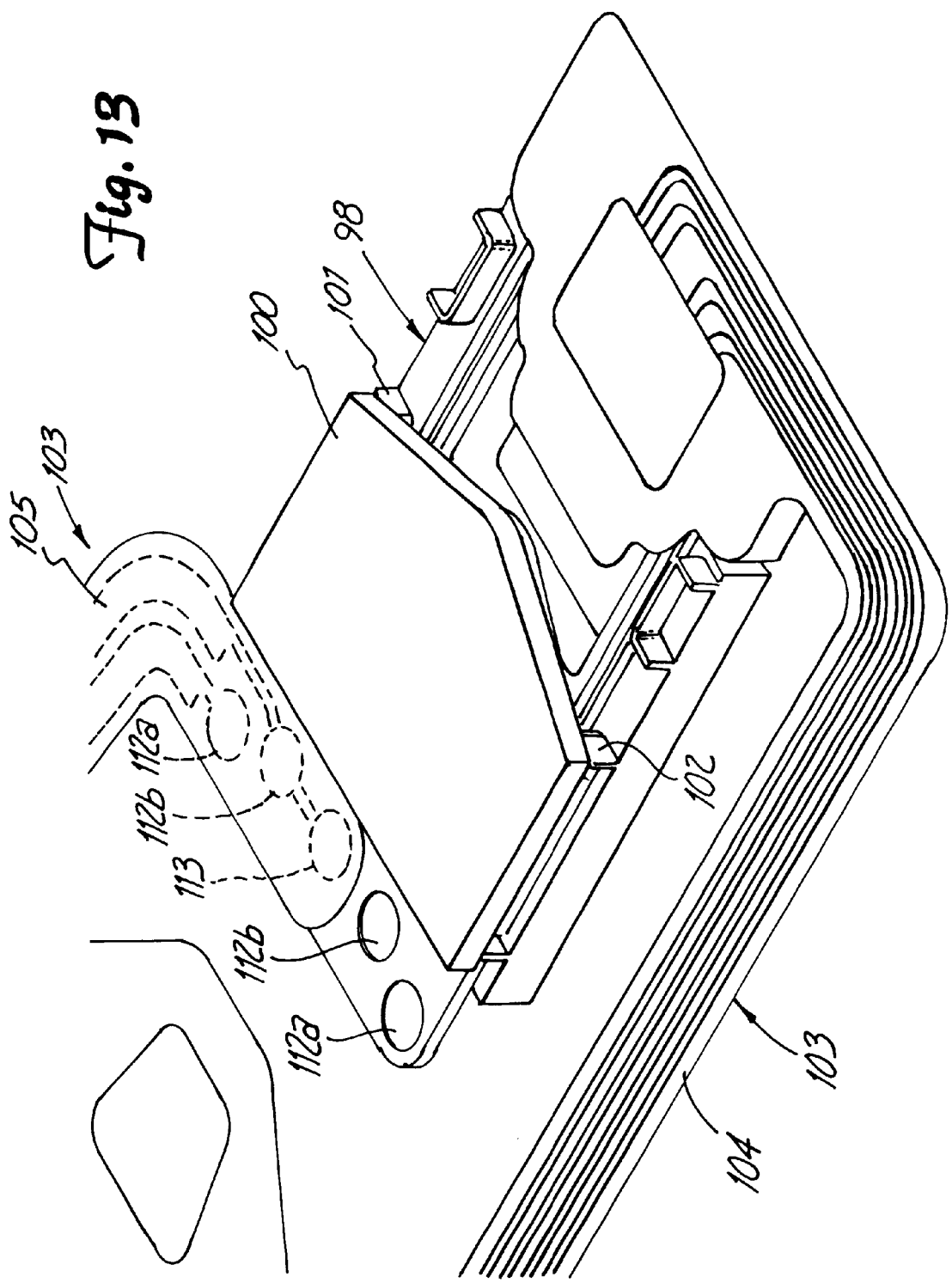
FIG. 13 is atop perspective view of a magnetic microactuator system having a top keeper plate as generally shown in FIG. 12, further illustrating the flex circuit for contacting the microactuator and the transducing head.

FIG. 13 is a perspective view of magnetic microactuator system 98 as shown in FIG. 12, further illustrating flex circuit 103 for electrically contacting the dual-layer coil carried by top keeper plate 100 and the transducing head carried by the disc drive slider. Flex circuit 103 includes flex circuit portion 104 for electrically contacting the transducing head, and flex circuit portion 105 for connection to coil terminal bond pads 112a and 112b to supply current through the dual-layer coil carried by top keeper plate 100, and coil via terminal 113 is provided to connect to the center of coil 112 for an alternate embodiment where a single-layer coil is used on top keeper plate 100 rather than a dual-layer coil.

Figure 14:
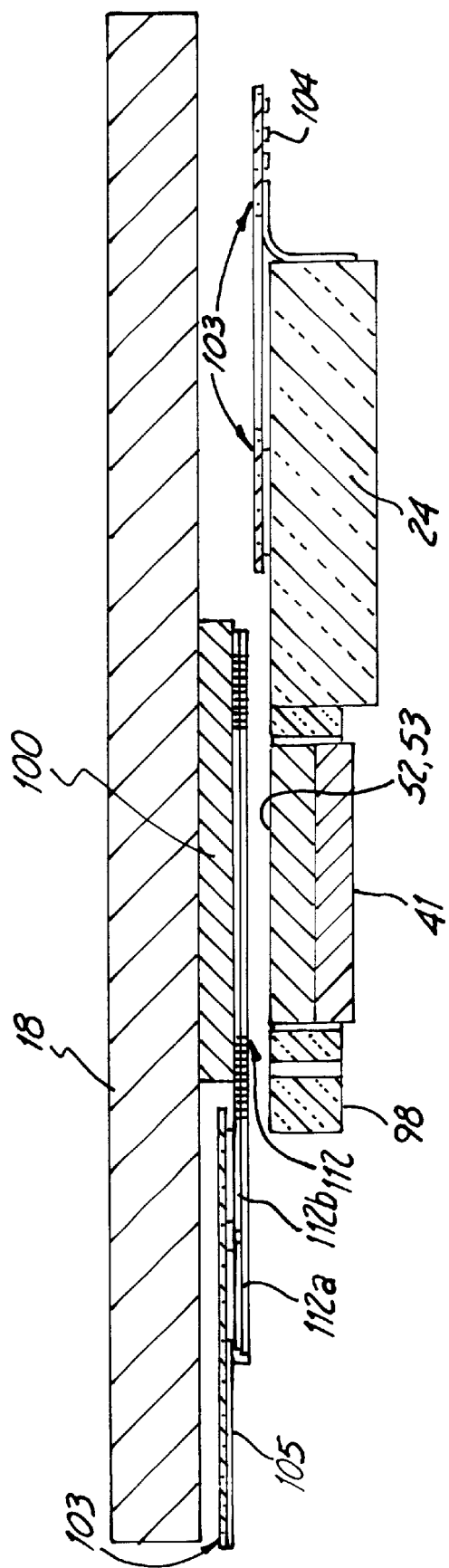
FIG. 14 is a section view of a disc drive system employing the magnetic microactuator system of the second embodiment of the present invention.

FIG. 14 is a section view taken at the center of the width of a disc drive system employing magnetic microactuator 98 according to the second embodiment of the present invention. The magnetic circuit formed below suspension load beam 18 includes top keeper plate 100 carrying dual-layer coil 112, magnets 52, 53 and bottom keeper 41. Top keeper plate 100 includes an extended portion supporting separate coil terminal bond pads 112a and 112b connected to respective layers of dual-layer coil 112. Flex circuit portion 105 is electrically connected to coil terminal bonds pads 112a and 112b to supply current through dual-layer coil 112 to operate microactuator 98. Flex circuit portion 104 is electrically connected to the transducing head carried by slider 24. In the configuration shown in FIG. 14, with a gap between flex circuit portion 105 and suspension load beam 18 of 50 micro-meters ($\mu$m), the total package height from the top of suspension load beam 18 to the bottom of slider 24 is 735 $\mu$m.

Similar to the first embodiment shown in FIGS. 3–6, operation of microactuator 98 is achieved by circulating current through the windings of dual-layer coil 112 which results in cross-track movement of slider 24 in a horizontal plane generally parallel to the surface of the disc, in the direction of arrows 31, with the movement being permitted by the flexibility of the beam springs of microactuator 98. Microactuator 98 is structurally similar to microactuator 30 shown in FIG. 3, with outer preloading bars forming the stator of the motor and magnets, a slider bond pad, slider 24, flexible beams and inner alignment clips effectively forming the rotor of the motor (see FIG. 3). Thus, lateral movement of the magnets due to circulation of a current through dual-layer coil 112 affects the cross-track (radial) position of slider 24 with respect to the outer preloading bars and also with respect to the tracks of the disc, thereby achieving high resolution positioning of the transducing head.

The second embodiment of the present invention, utilizing top keeper plate 100 as shown in FIGS. 7A–7C and 8–14, may implement dual-layer coil 112 with a wire size and spacing of 8 $\mu$m and a wire thickness of 15 $\mu$m. This wire configuration provides 88 magnet face traverses, and coil 112 has a resistance of 25.4 Ohms at 150° C. As a result of the high wire resolution that may be achieved, this embodiment is able to achieve microactuation performance at low current levels that is significantly improved over prior art configurations, as shown in the table below.

| Current | Actuation Force | Power Dissipation | Stroke (at 1 kHz) |
|---|---|---|---|
| 30 mA | 0.89 mN | 23 mW | 8.5 $\mu$m |
| 35 mA | 1.03 mN | 31 mW | 9.8 $\mu$m |
| 50 mA | 1.48 mN | 63 mW | 14.0 $\mu$m |
| 100 mA | 2.95 mN | 254 mW | 28.0 $\mu$m |

With relatively low current and power dissipation levels, the microactuator of the second embodiment of the present invention is able to achieve microactuator strokes greater than 12 $\mu$m. A stroke of greater than about 12 $\mu$m is required to ensure proper microactuator seeking operation performance in a disc drive system having a disc stack of 10 discs, due to misalignment between the disc stack spindle and the actuator system. In addition, top keeper plate 100 is attached to microactuator 98 to form a unitary microactuator structure, that does not require any additional steps when the disc drive is being assembled.

Third Embodiment (FIGS. 15–19)

Figure 15:
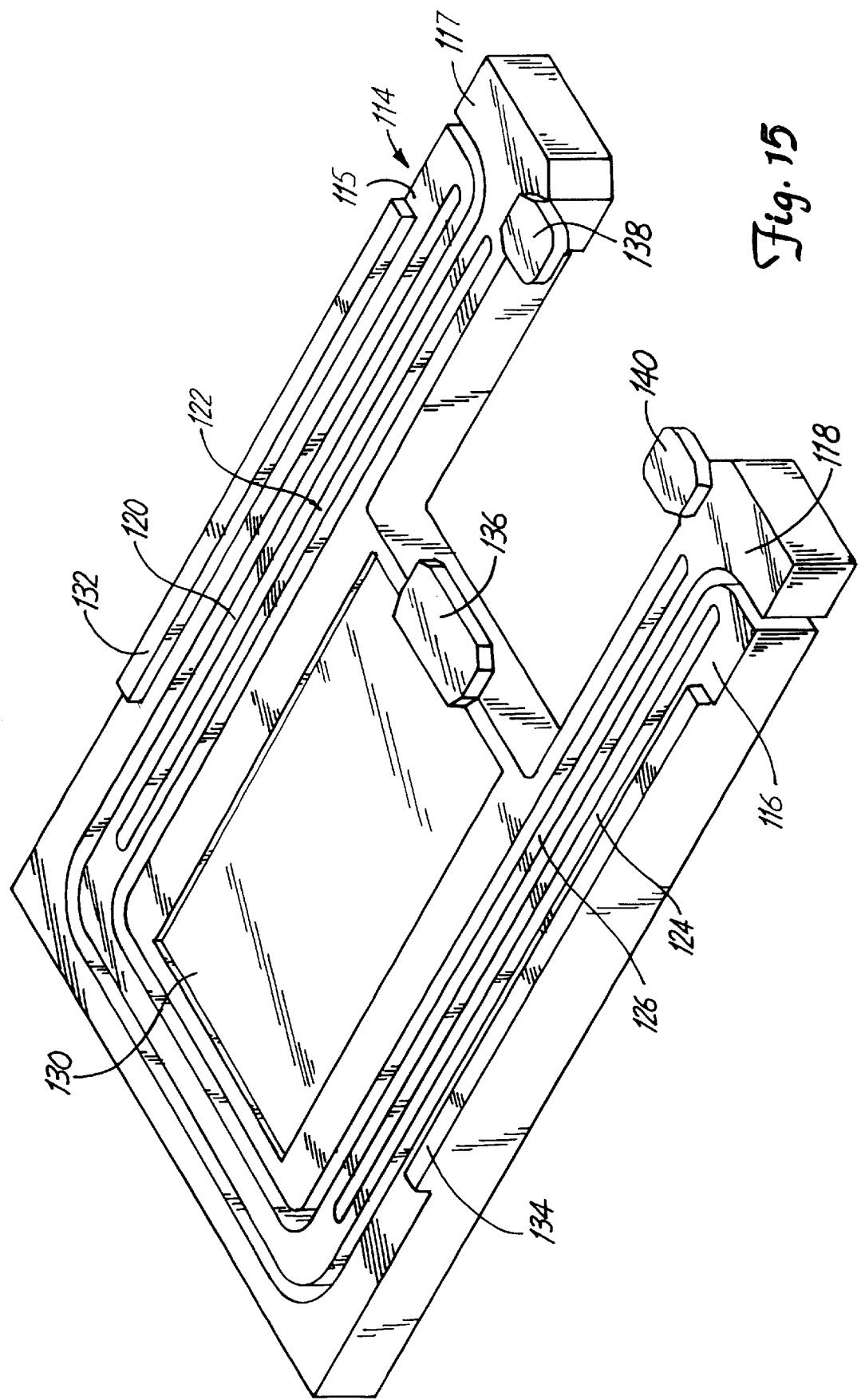
FIG. 15 is a perspective view of a magnetic microactuator suspension for carrying a moving dual-layer coil according to a third embodiment of the present invention.

FIG. 15 is a perspective view of magnetic microactuator 114 for carrying a movable dual-layer coil (that is, as part of the microactuator rotor) according to a third embodiment of the present invention. Microactuator 114 includes outer preloading bars 115 and 116 and inner alignment clips 117 and 118 for receiving a slider (not shown) therebetween. Flexible beam springs 120 and 122 connect outer preloading bar 115 and inner alignment clip 117, and flexible beam springs 124 and 126 connect outer preloading bar 116 and inner alignment clip 118. A ferromagnetic keeper 130 is provided on the substrate of microactuator 114. Keeper 130 may take the form of an insert molded into a recess formed in the substrate, where the substrate is formed by a Metal Injection Molding (MIM) process. Standoffs 132 and 134 are provided on outer preloading bars 115 and 116 to be borne upon by a preloading bridge of a flexure (such as flexure 22, FIG. 3) to apply preload force to the microactuator structure. Bond pads 136, 138 and 140 are provided for attachment to a top surface (opposite the air-bearing surface) of a slider, so that movement of alignment clips 117 and 118 with respect to outer preloading bars 115 and 116 effected by microactuator 114 results in corresponding radial movement of the slider to achieve high resolution positioning of the transducing head carried by the slider.

Figure 16:
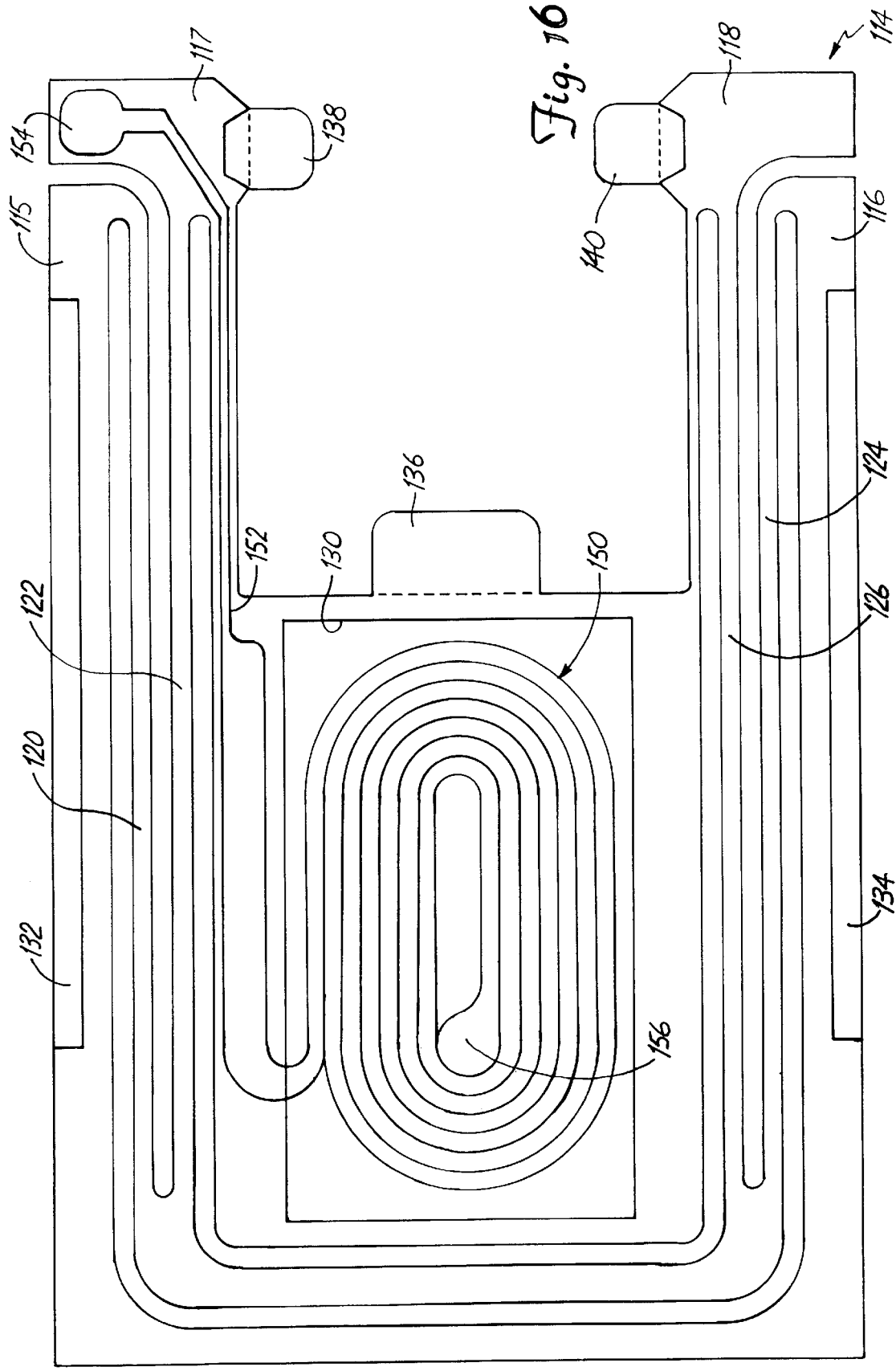
FIG. 16 is a top view of the microactuator suspension shown in FIG. 11 illustrating the first coil layer.

FIG. 16 is a top view of magnetic microactuator 114 illustrating a first coil layer of dual-layer coil 150 on ferromagnetic keeper 130, and FIG. 17 is a top view of magnetic microactuator 114 illustrating both coil layers of dual-layer coil 150. The first layer of dual-layer coil 150 is connected by conductive trace 152 formed on inner alignment clip 117 to bond pad 154, and the second layer of dual-layer coil 150 is connected by conductive trace 153 formed on inner alignment clip 118 to bond pad 155. The first and second layers of dual-layer coil are connected to each other by conductive via 156.

FIG. 18 is a perspective view of magnetic microactuator 114 having flexure 22 suspended thereabove to carry magnets 162 and 163 and top ferromagnetic keeper 164 and to provide preloading force to standoffs 132 and 134 on outer preloading bars 115 and 116. Flexure 22 is shaped to include arms 84 and 86 and cross beam 89 therebetween at a distal end of flexure 22. Central bridge portion 92 is located in the aperture between arms 84 and 86 and cross beam 89, with a platform directly above dual-layer coil 150, and bears upon standoffs 132 and 134 to apply preloading force to outer preloading bars 115 and 116 of microactuator 114. Magnets 162 and 163 are attached to bridge portion 92 of flexure 22 above dual-layer coil 150, and top ferromagnetic keeper 164 is formed on top of magnets 164 to complete the vertical magnetic circuit of bottom ferromagnetic keeper 130, dual-layer coil 150, magnets 162 and 163 and top ferromagnetic keeper 164. In the embodiment shown in FIG. 18, magnets 162 and 163 are fixed and dual-layer coil 150 on bottom ferromagnetic keeper 130 moves laterally in response to a current applied at bond pads 154 and 155 to flow through dual-layer coil 150, thereby effecting movement of slider-supporting alignment clips 117 and 118 with respect to outer preloading bars 115 and 116 to radially position the transducing head carried by the slider.

Dual-layer coil 150 may be formed in a manner similar to dual-layer coil 106 shown with respect to the second embodiment (FIGS. 7A, 7B, 7C and 8–14), with a wire size and spacing of 8 μm and a wire thickness of 15 μm. This wire configuration has characteristic parameters and performance similar to that described above with respect to the second embodiment of the invention. Dual-layer coil 150 may be plated, etched, wound from fine wire or realized by any other suitable method known in the art to achieve the desired resolution and magnet face traverses.

Figure 19A:
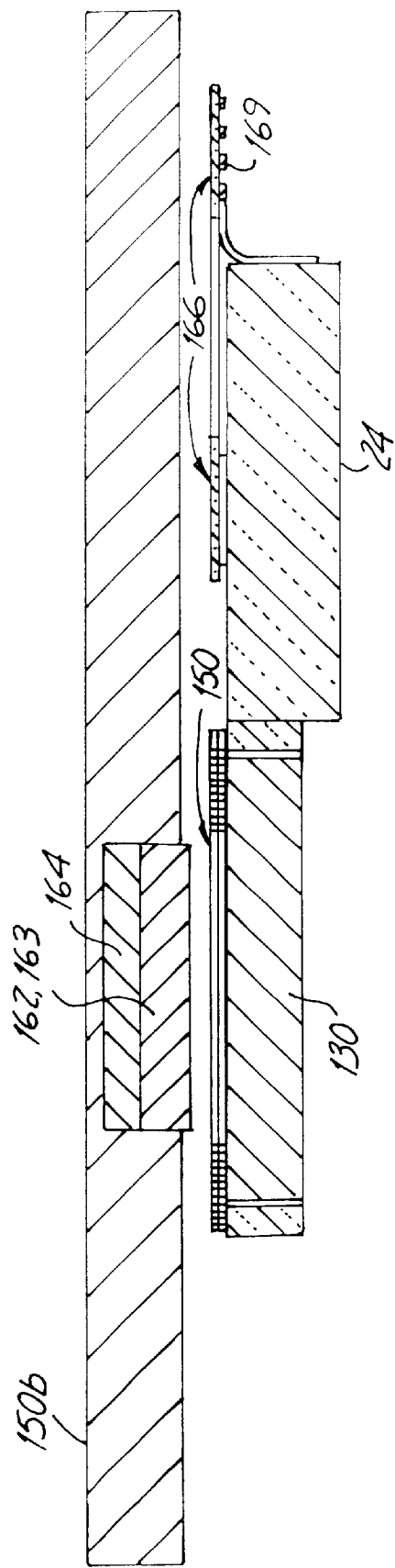
FIG. 19A is a section view of a disc drive system employing a magnetic microactuator system according to the third embodiment of the present invention, with microactuator contacts on the microactuator suspension at a distal end near the slider.

FIG. 19A is a section view taken at the center of the width of a disc drive system employing magnetic microactuator 114 according to the third embodiment of the present invention. The magnetic circuit formed below suspension load beam 18 includes top keeper 164, magnets 162, 163, dual-layer coil 150 and bottom keeper 130. Flex circuit 166 is provided to make electrical connections with the transducing head carried by slider 24 and to coil 150 for operating microactuator 114. Flex circuit portion 168 is electrically connected to coil terminal bonds pads 154 and 155 (shown in FIGS. 17 and 18) to supply current through conductive traces 152 and 153 (FIG. 17) to coil 150 for operation of microactuator 114. Flex circuit portion 169 is electrically connected to the transducing head carried by slider 24.

Figure 19B:
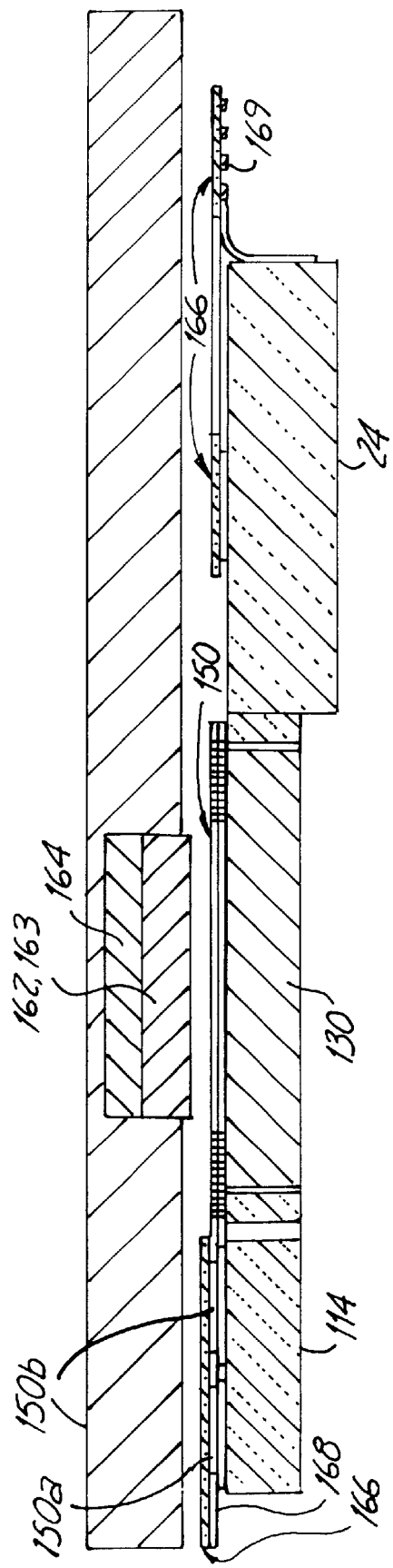
FIG. 19B is a section view of a disc drive system employing a magnetic microactuator system according to the third embodiment of the present invention, with microactuator contacts on the microactuator suspension at a proximal end opposite from the slider.

FIG. 19B is a section view taken at the center of the width of a disc drive system employing magnetic microactuator 114 according to an alternate configuration of the third embodiment of the present invention. The magnetic circuit formed below suspension load beam 18 includes top keeper 164, magnets 162, 163, dual-layer coil 150 and bottom keeper 130. The substrate of microactuator 114 includes an extended portion supporting separate coil terminal bond pads 150a and 150b for electrical connection to the respective layers of dual-layer coil 150. Flex circuit 166 is provided to make electrical connections with the transducing head carried by slider 24 and to coil 150 for operating microactuator 114. Flex circuit portion 168 is electrically connected to coil terminal bonds pads 150a and 150b to supply current through coil 150 for operation of microactuator 114. Flex circuit portion 169 is electrically connected to the transducing head carried by slider 24.

In the third embodiment of the invention, the substrate of microactuator 114 is slightly larger than microactuator 30 (FIG. 3) or microactuator 98 (FIG. 7A), with an outer perimeter of about 3095 by 1900 by 200 microns in an exemplary configuration. Both of the configurations shown in FIGS. 19A and 19B enable reduction of the head gimbal assembly (HGA) package height by 70 μm relative to the second embodiment, to a total package height of 665 μm.

Figure 21:
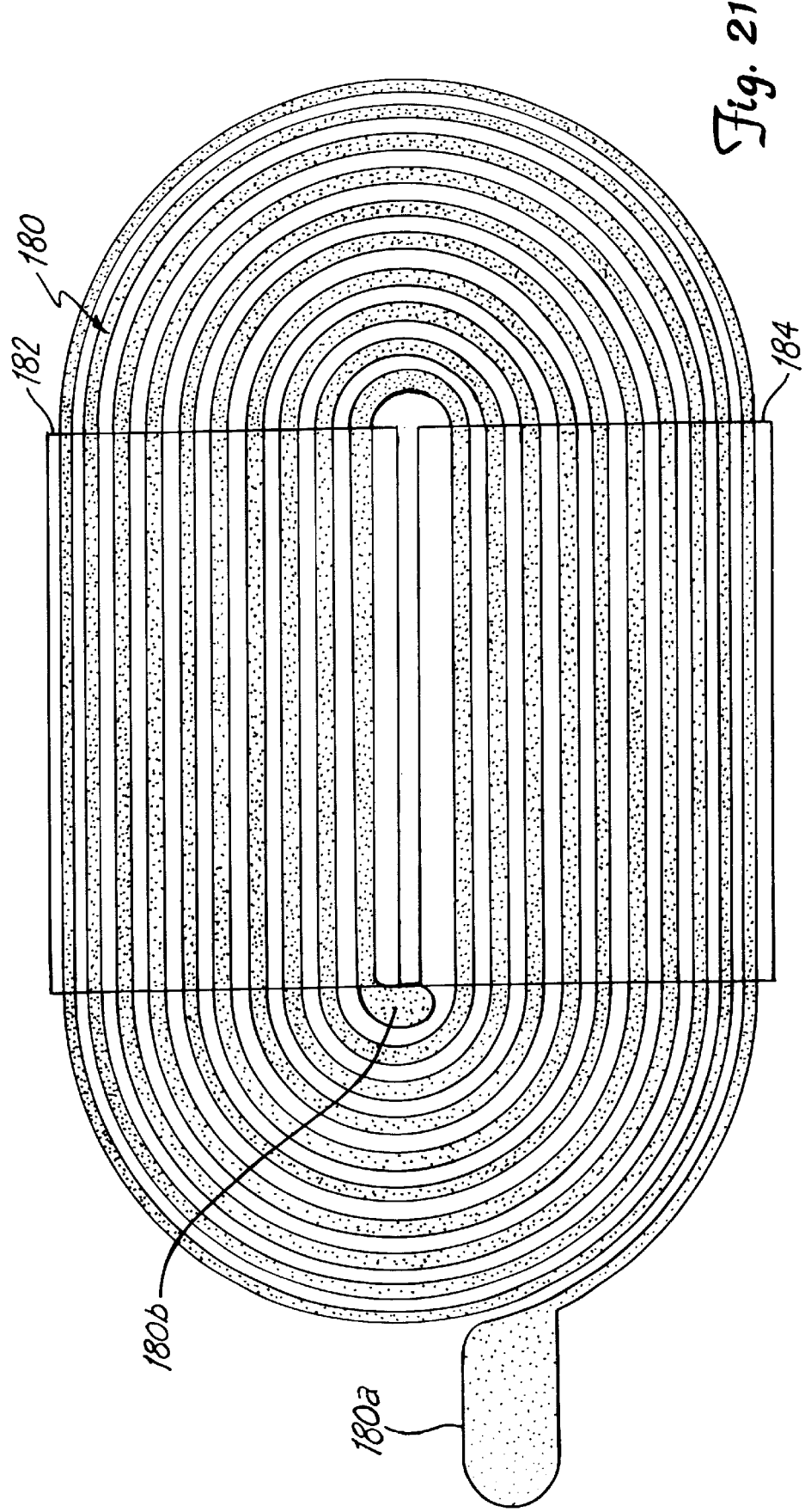
FIG. 21 is a plan view of a single-layer coil for use with a magnetic microactuator employing two magnets, according to the fourth embodiment of the present invention.

Fourth Embodiment (FIGS. 20 and 21)

FIG. 20 is a plan view of single-layer coil 170 for use with a magnetic microactuator employing four magnets, according to a fourth embodiment of the present invention. The drawing of FIG. 20 is illustrative in nature, and does not necessarily depict the exact dimensional relationships and total number of coil windings and traverses that are actually utilized in the microactuator system. Single layer coil 170 is formed on the underside of a top keeper plate, similar to the configuration of the first coil layer of dual-layer coil 150 shown in FIG. 9. Four magnets 172, 174, 176 and 178 are provided on the microactuator substrate attached to a bottom keeper on the substrate, and the top keeper plate carrying coil 170 is attached to the microactuator stator to form the vertical magnetic circuit for effecting microactuation. Bond pads 170a and 170b are provided to electrically contact coil 170, for connection to a current-providing source. An out-of-plane jumper connection is required to access bond pad 170a, which may be provided by the flex circuit or by a pattern of conductive traces on the top keeper plate itself.

Utilizing a high aspect ratio plating mold to form coil 170, the conductor spacing may be made as small as 5 μm with a conductor width of 15 μm and a conductor thickness as great as 50 μm. Coil thicknesses up to about 50 μm are desirable to minimize the coil resistance and its associated power dissipation, while coil thicknesses exceeding about 50 μm tend to cause a decrease in magnetic field strength due to increased gap length in the magnetic circuit. With this configuration, nine coil traverses per magnet, or 36 total magnet face traverses, are achieved, and the coil resistance at 150° C. is 1.3 Ohms. For the amounts of microactuation force shown in the table above with respect to FIGS. 7A–7C and 8–14, lower power dissipation is achieved and 2.4 times as much current is required. If the conductor width is reduced from 15 μm to 5 μm, the number of magnet face traverses is doubled (to 72 total turns), and the resistance of the coil increases to 7.9 Ohms at 150° C. In this modified configuration, the required current is 22% greater than the 88 turn dual-layer coil shown in FIGS. 7A–7C and 8–14, and the power dissipation for the same actuation force is less than half as much. For example, 61 milli-Amps (mA) of current through the 72 turn single layer coil generates 1.48 milli-Newtons (mN) of force with a power dissipation of 29 milli-Watts (mW), compared to 63 mW of power at 50 mA to generate 1.48 mN of force with the 88 turn double layer coil.

FIG. 21 is a plan view of single-layer coil 180 for use with a magnetic microactuator employing two magnets, according to another configuration of the fourth embodiment of the present invention. The drawing of FIG. 21 is illustrative in nature, and does not necessarily depict the exact dimensional relationships and total number of coil windings and traverses that are actually utilized in the microactuator system. Single layer coil 180 is formed on the underside of a top keeper plate, similar to the configuration of the first coil layer of dual-layer coil 150 shown in FIG. 9. Two magnets 182 and 184 are provided on the microactuator substrate attached to a bottom keeper on the substrate, and the top keeper plate carrying coil 180 is attached to the microactuator stator to form the vertical magnetic circuit for effecting microactuation. Bond pads 180a and 180b are provided to electrically contact coil 180, for connection to a current-providing source. An out-of-plane jumper connection is required to access bond pad 180a, which may be provided by the flex circuit or by a pattern of conductive traces on the top keeper plate itself.

Utilizing a high aspect ratio plating mold to form coil 180, similar to the process of forming coil 170 shown in FIG. 20, in an exemplary embodiment the conductor spacing is 7 μm with a conductor width of 12 μm and a conductor thickness as great as 50 μm. With this configuration, 13 coil traverses per magnet, or 26 total magnet face traverses, and achieved, and the coil resistance at 150° C. is 1.3 Ohms. For the amounts of microactuation force shown in the table above with respect to FIGS. 7A–7C and 8–14, lower power dissipation is achieved and a slightly higher current is required, similar to the performance characteristics of the single-layer coil embodiment shown in FIG. 20.

While the fourth embodiment of the invention has been described as a configuration where the microactuator coil is formed on a top keeper plate, it should be understood that the coil may be formed on the microactuator substrate as well, similar to the design of the third embodiment (FIGS. 15–19).

The single-layer coil design of the fourth embodiment (FIGS. 20 and 21) utilizes relatively simple assemblies and has certain performance advantages, but requires a fairly complex arrangement to contact the single-layer coil at both ends of the coil.

CONCLUSION

The present invention provides a number of coil and magnet configurations in a disc drive microactuation system for finely positioning a transducing head over a selected track of a disc. The dual-layer coil structures of the first, second and third embodiments and the high resolution single-layer coil structure of the fourth embodiment are able to provide high microactuation forces and therefore high microactuator strokes able to perform seeking operations, potentially even for a disc stack of 10 discs, with current requirements of about 100 mA or less and power dissipation of about 250 mW or less. This reduction of current and power dissipation is achievable due to the increased number of magnet face traverses by the coil, attributable to the configurations and dimensions of the coil provided by the present invention. For example, providing the via between coil layers offset from the magnet area as in the first embodiment of the present invention (FIGS. 5 and 6) increases the number of magnet face traverses by the coil. Fabricating the dual-layer coil directly on a top keeper plate as in the second embodiment of the present invention (FIGS. 7A–7C and 8–14) or on the microactuator substrate (FIGS. 15–19) increases the achievable resolution of the coil wires and therefore increases the number of magnet face traverses by the coil. Utilizing a single-layer coil with high resolution windings and either two or four magnets in the magnetic microactuator circuit as in the fourth embodiment of the present invention (FIGS. 20 and 21) also increases the number of magnet face traverses by the coil compared to prior designs, and simplifies some of the wafer processes involved to form the microactuator.

Although the present invention has been described with reference to preferred embodiments, workers skilled in the art will recognize that changes may be made in form and detail without departing from the spirit and scope of the invention.

What is claimed is:

1. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly including a coarsely movable support structure and a microactuator, the microactuator comprising:
   a stator attached to the support structure;
   a rotor operatively attached to the slider, the rotor being movable with respect to the stator in a first horizontal plane generally parallel to a surface of the disc; and
   a magnetic circuit arranged vertically in a plurality of planes substantially parallel to the first horizontal plane to move the microactuator rotor and the slider in the first horizontal plane generally parallel to the surface of the disc with a stroke at the slider of at least 2 micro-meters in response to a current of no greater than 100 milli-Amps provided to the magnetic circuit, the magnetic circuit comprising:
   a bottom ferromagnetic keeper, a plurality of magnets, a patterned conductive coil and a top ferromagnetic keeper vertically arranged in the plurality of planes substantially parallel to the first horizontal plane, the magnets being operable in response to the current being provided to the conductive coil to move laterally and thereby cause movement of the microactuator rotor in the first horizontal plane generally parallel to the surface of the disc.

2. The disc drive of claim 1, wherein the top ferromagnetic keeper is located on a top surface of a flexure opposite the microactuator and the patterned conductive coil is suspended from an underside of the flexure between the top ferromagnetic keeper and the plurality of magnets.

3. The disc drive of claim 2, wherein the patterned conductive coil comprises a dual-layer coil suspended between the top ferromagnetic keeper and the plurality of magnets, wherein first and second layers of the dual-layer coil are connected to each other by a conductive via extending through the flexure at a region offset from the magnets.

4. The disc drive of claim 3, wherein the conductive coil has a wire spacing and width of about 38 micro-meters.

5. The disc drive of claim 4, wherein the conductive coil has 20 turns traversing faces of the plurality of magnets.

6. The disc drive of claim 1, further comprising a plate carrying the top ferromagnetic keeper and the conductive coil above the plurality of magnets, wherein the plate is attached to the stator of the microactuator and a flexure includes an aperture accommodating the plate.

7. The disc drive of claim 6, wherein the conductive coil is a dual-layer coil.

8. The disc drive of claim 7, wherein the conductive coil has a wire spacing and width of about 8 micro-meters and a wire thickness of about 15 micro-meters.

9. The disc drive of claim 7, wherein the conductive coil has 88 turns traversing faces of the plurality of magnets.

10. The disc drive of claim 7, wherein the microactuator is operable to laterally move the transducing head with a stroke of at least 12 micro-meters in response to current of no greater than 100 milli-Amps with power dissipation of no greater than 250 milli-Watts.

11. The disc drive of claim 6, wherein the conductive coil is a single-layer coil.

12. The disc drive of claim 11, wherein the conductive coil has a wire spacing and width of 5 micro-meters and a wire thickness of 50 micro-meters.

13. The disc drive of claim 11, wherein the plurality of magnets comprises four adjacent magnets and the conductive coil has 72 turns traversing faces of the four adjacent magnets.

14. The disc drive of claim 11, wherein the plurality of magnets comprises two adjacent magnets and the conductive coil has 26 turns traversing faces of the two adjacent magnets.

15. The disc drive of claim 11, wherein the microactuator is operable to laterally move the transducing head with a stroke of at least 12 micro-meters in response to current of no greater than 100 milli-Amps with power dissipation of no greater than 250 milli-Watts.

16. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly including a coarsely movable support structure and a microactuator, the microactuator comprising:
   a stator attached to the support structure;
   a rotor operatively attached to the slider, the rotor being movable with respect to the stator in a first horizontal plane generally parallel to a surface of the disc; and
   a magnetic circuit arranged vertically in a plurality of planes substantially parallel to the first horizontal plane to move the microactuator rotor and the slider in the first horizontal plane generally parallel to the surface of the disc with a stroke at the slider of at least 2 micro-meters in response to a current of no greater than 100 milli-Amps provided to the magnetic circuit, the magnetic circuit comprising:

a bottom ferromagnetic keeper, a plurality of magnets, a dual-layer patterned conductive coil and a top ferromagnetic keeper arranged in a plurality of planes substantially parallel to the first horizontal plane, the dual-layer conductive coil being located on the bottom ferromagnetic keeper on the microactuator rotor and the magnets and the top ferromagnetic keeper being supported above the conductive coil, wherein the magnets are operable in response to the current being provided to the dual-layer conductive coil to move the coil laterally and thereby cause movement of the microactuator rotor in the first horizontal plane generally parallel to the surface of the disc.

17. The disc drive of claim 16, wherein the dual-layer conductive coil has 88 magnet face traverses, with a wire size and spacing of 8 micro-meters and a wire thickness of 15 micro-meters.

18. The disc drive of claim 16, wherein the microactuator is operable to laterally move the transducing head with a stroke of at least 12 micro-meters in response to current of no greater than 100 milli-Amps with power dissipation of no greater than 250 milli-Watts.

* * * * *